US012711673B2

(12) United States Patent
Shu et al.

(10) Patent No.: US 12,711,673 B2
(45) Date of Patent: Aug. 18, 2026

(54) EDITING SHADOWS IN DIGITAL IMAGES UTILIZING MACHINE LEARNING MODELS

(71) Applicant: Adobe Inc., San Jose, CA (US)

(72) Inventors: Zhixin Shu, San Jose, CA (US); Andrew Hou, East Lansing, MI (US); He Zhang, San Jose, CA (US); Xuaner Zhang, San Jose, CA (US); Yannick Hold-Geoffroy, Quebec City (CA); Jae Shin Yoon, San Jose, CA (US)

(73) Assignee: Adobe Inc., San Jose, CA (US)

( * ) Notice: Subject to any disclaimer, the term of this patent is extended or adjusted under 35 U.S.C. 154(b) by 171 days.

(21) Appl. No.: 18/651,176

(22) Filed: Apr. 30, 2024

(65) Prior Publication Data

US 2025/0336100 A1 Oct. 30, 2025

(51) Int. Cl.
*G06T 11/00* (2026.01)

(52) U.S. Cl.
CPC ......... *G06T 11/00* (2013.01); *G06T 2211/441* (2023.08)

(58) Field of Classification Search
None
See application file for complete search history.

(56) References Cited

U.S. PATENT DOCUMENTS 9,188,783 B2 * 11/2015 Papas ................. G02B 27/0927
10,140,754 B1 * 11/2018 Voris ................... G06F 3/04845
10,665,011 B1 * 5/2020 Sunkavalli ............. G06N 3/084
2017/0034453 A1 * 2/2017 Usikov ................ G06V 40/162
2018/0114359 A1 * 4/2018 Song ................ H04N 21/42202
2020/0302684 A1 * 9/2020 Sunkavalli ........... G06V 10/764
2021/0065440 A1 * 3/2021 Sunkavalli ................ G06T 7/70
2021/0295571 A1 * 9/2021 Sun .......................... G06T 5/94
2022/0101596 A1 * 3/2022 Volkov .................... G06T 19/20
2022/0130087 A1 * 4/2022 Sun ......................... G06T 15/06
2022/0335682 A1 * 10/2022 Dave ....................... G06N 3/09

(Continued)

OTHER PUBLICATIONS

Adam Paszke, Sam Gross, Soumith Chintala, Gregory Chanan, Edward Yang, Zachary DeVito, Zeming Lin, Alban Desmaison, Luca Antiga, and Adam Lerer. "Automatic Differentiation in PyTorch". In 31st Conference on Neural Information Processing Systems (NIPS), 4 pages, Oct. 2017.

(Continued)

*Primary Examiner* — Jeffrey J Chow
(74) *Attorney, Agent, or Firm* — Keller Preece PLLC

(57) ABSTRACT

The present disclosure relates to systems, non-transitory computer-readable media, and methods for editing shadows in digital images. In particular, in some embodiments, the disclosed systems determine, utilizing a lighting estimation network, an environment map for a digital image, the environment map comprising a dominant light. In addition, in some embodiments, the disclosed systems generate, utilizing a lighting diffusion network, a diffused image from the digital image, the diffused image comprising smoothed shading. Moreover, in some embodiments, the disclosed systems generate, utilizing a shadow synthesis network, a shadowed image from the diffused image and a modified environment map comprising a modified dominant light. Furthermore, in some embodiments, the disclosed systems generate, from the diffused image and the shadowed image, a modified digital image comprising an edited shadow.

20 Claims, 12 Drawing Sheets

(56) References Cited

U.S. PATENT DOCUMENTS

| | | | | |
|---|---|---|---|---|
| 2024/0153201 | A1* | 5/2024 | Ranjan | G06T 15/08 |
| 2024/0212106 | A1* | 6/2024 | LeGendre | G06T 5/94 |
| 2025/0200723 | A1* | 6/2025 | Lai | G06T 5/94 |
| 2025/0238904 | A1* | 7/2025 | Pandey | G06T 11/60 |
| 2025/0292462 | A1* | 9/2025 | Feng | G06T 5/50 |

OTHER PUBLICATIONS

Agil Aghasanli, Dmitry Kangin, and Plamen Angelov. "Interpretable-through-prototypes deepfake detection for diffusion models". In IEEE/CVF International Conference on Computer Vision Workshops (ICCVW), pp. 467-474, 2023.
Andrew Hou, Michel Sarkis, Ning Bi, Yiying Tong, and Xiaoming Liu. "Face Relighting with Geometrically Consistent Shadows". In Conference on Computer Vision and Pattern Recognition (CVPR), pp. 4217-4226, 2022.
Andrew Hou, Ze Zhang, Michel Sarkis, Ning Bi, Yiying Tong, and Xiaoming Liu. "Towards High Fidelity Face Relighting with Realistic Shadows". In Conference on Computer Vision and Pattern Recognition (CVPR), pp. 14719-14728, 2021.
Anurag Ranjan, Kwang Moo Yi, Jen-Hao Rick Chang, and Oncel Tuzel. "FaceLit: Neural 3D Relightable Faces". In Conference on Computer Vision and Pattern Recognition (CVPR), pp. 8619-8728, 2023.
Chaonan Ji, Tao Yu, Kaiwen Guo, Jingxin Liu, and Yebin Liu. "Geometry-aware Single-image Full-body Human Relighting". In European Conference on Computer Vision (ECCV), pp. 388-405, Oct. 21, 2022.
David Futschik, Kelvin Ritland, James Vecore, Sean Fanello, Sergio Orts-Escolano, Brian Curless, Daniel Sykora, and Rohit Pandey. "Controllable Light Diffusion for Portraits". In Conference on Computer Vision and Pattern Recognition (CVPR), pp. 8412-8421, Jun. 2023.
Diederik Kingma and Jimmy Ba. "ADAM. A Method for Stochastic Optimization". In International Conference on Learning (ICLR), pp. 1-9, arXiv preprint arXiv:1412.6980v1, Dec. 22, 2014.
Diederik P. Kingma and Max Welling. "Auto-Encoding Variational Bayes". In International Conference on Learning Representations (ICLR), 15 pages. arXiv preprint arXiv:1312.6114v10, May 1, 2014.
Feitong Tan, Sean Fanello, Abhimitra Meka, Sergio OrtsEscolano, Danhang Tang, Rohit Pandey, Jonathan Taylor, Ping Tan, and Yinda Zhang. "VoLux-GAN: A Generative Model for 3D Face Synthesis with HDRI Relighting". In ACM SIGGRAPH Conference Proceedings Canada, 9 pages, Aug. 2022.
Ha Le and loannis Kakadiaris. "Illumination-invariant Face Recognition with Deep Relit Face Images". In IEEE/CVF Winter Conference on Applications of Computer Vision (WACV), pp. 2146-2155, Jan. 2019.
Hao Zhou, Sunil Hadap, Kalyan Sunkavalli, and David W. Jacobs. "Deep Single Portrait Image Relighting". In IEEE/CVF International Conference on Computer Vision (ICCV), pp. 7194-7202, Oct. 2019.
Ian Goodfellow, Jean Pouget-Abadie, Mehdi Mirza, Bing Xu, DavidWarde-Farley, Sherjil Ozair, Aaron Courville, and Yoshua Bengio. "Generative Adversarial Nets". In NeurIPS, 9 pages, 2014.
Jonathan Ho, Ajay Jain, and Pieter Abbeel. "Denoising Diffusion Probabilistic Models". In 34th Conference on Neural Information Processing Systems (NeurIPS), 2020.
Jooyoung Choi, Sungwon Kim, Yonghyun Jeong, Youngjune Gwon, and Sungroh Yoon. "ILVR: Conditioning Method for Denoising Diffusion Probabilistic Models". In IEEE/CVF International Conference on Computer Vision (ICCV), pp. 14367-14376, Oct. 2021.
Joshua Weir, Junhong Zhao, Andrew Chalmers, and Taehyun Rhee. "Deep Portrait Delighting". In European Conference on Computer Vision (ECCV), pp. 423-439, Oct. 2022.
Kaiwen Guo, Peter Lincoln, Philip Davidson, Jay Busch, Xueming Yu, Matt Whalen, Geoff Harvey, Sergio Orts-Escolano, Rohit Pandey, Jason Dourgarian, Matthew DuVall, Danhang Tang, Anastasia Tkach, Adarsh Kowdle, Emily Cooper, Mingsong Dou, Sean Fanello, Graham Fyffe, Christoph Rhemann, Jonathan Taylor, Paul Debevec, and Shahram Izadi. "The Relightables: Volumetric Performance Capture of Humans with Realistic Relighting". In ACM SIGGRAPH Conference Proceedings Asia, 38(6), 19 pages, Nov. 2019.
Karen Simonyan and Andrew Zisserman. "Very Deep Convolutional Networks for Large-Scale Image Recognition". In International Conference on Learning (ICLR), pp. 1-14, arXiv preprint arXiv: 1409.1556v6, Apr. 10, 2015.
Longwen Zhang, Qixuan Zhang, Minye Wu, Jingyi Yu, and Lan Xu. "Neural Video Portrait Relighting in Real-time via Consistency Modeling". In IEEE/CVF International Conference on Computer Vision (ICCV), pp. 802-812, Oct. 2021.
Manuel Lagunas, Xin Sun, Jimei Yang, Ruben Villegas, Jianming Zhang, Zhixin Shu, Belen Masia, and Diego Gutierrez. "Single-image Full-body Human Relighting". In Eurographics Symposium on Rendering (EGSR), 11 pages, arXiv preprint arXiv:2107.07259v1, Jul. 15, 2021.
Paul Debevec, Tim Hawkins, Chris Tchou, Haarm-Pieter Duiker, Westley Sarokin, and Mark Sagar. "Acquiring the Reflectance Field of a Human Face". In ACM SIGGRAPH 2022 Conference Proceedings, pp. 145-156, Jul. 2000.
Peter Lorenz, Ricard L. Durall, and Janis Keuper. "Detecting Images Generated by Deep Diffusion Models using their Local Intrinsic Dimensionality". In IEEE/CVF International Conference on Computer Vision Workshops (ICCVW), pp. 448-459, Oct. 2023.
Pol Caselles, Eduard Ramon, Jaime Garcia, Xavier Giro I Nieto, Francesc Moreno-Noguer, and Gil Triginer. "SIRA: Relightable Avatars from a Single Image". In IEEE/CVF Winter Conference on Applications of Computer Vision (WACV), pp. 775-784, Jan. 2023.
Puntawat Ponglertnapakorn, Nontawat Tritrong, and Supasorn Suwajanakorn. "DiFaReli: Diffusion Face Relighting". In IEEE/CVF International Conference on Computer Vision (ICCV), p. 22646-22657, Apr. 2023.
Riccardo Corvi, Davide Cozzolino, Giada Zingarini, Giovanni Poggi, Koki Nagano, and Luisa Verdoliva. "On the Detection of Synthetic Images Generated by Diffusion Models". In IEEE International Conference on Acoustics, Speech and Signal Processing (ICASSP), pp. 1-5, Jun. 2023.
Richard Zhang, Phillip Isola, Alexei A Efros, Eli Shechtman, and Oliver Wang. "The Unreasonable Effectiveness of Deep Features as a Perceptual Metric". In Conference on Computer Vision and Pattern Recognition (CVPR), pp. 586-595, Jun. 2018.
Rohit Pandey, Sergio Orts-Escolano, Chloe LeGendre, Christian Haene, Sofien Bouaziz, Christoph Rhemann, Paul Debevec, and Sean Fanello. "Total Relighting: Learning to Relight Portraits for Background Replacement". ACM Transactions on Graphics (TOG), 40(4) 21 pages, Aug. 2021.
Roni Sengupta, Brian Curless, Ira Kemelmacher-Shlizerman, and Steve Seitz. "A Light Stage on Every Desk". In IEEE/CVF International Conference on Computer Vision (ICCV), p. 2420-249, Oct. 2021.
Sai Bi, Stephen Lombardi, Shunsuke Saito, Tomas Simon, Shih-En Wei, Kevyn McPhail, Ravi Ramamoorthi, Yaser Sheikh, and Jason Saragih. "Deep Relightable Appearance Models for Animatable Faces". ACM Transactions on Graphics (TOG), 40(4):1-15, Aug. 2021.
Sarthak Kamat, Shruti Agarwal, Trevor Darrell, and Anna Rohrbach. "Revisiting Generalizability in Deepfake Detection: Improving Metrics and Stabilizing Transfer". In IEEE/CVF International Conference on Computer Vision Workshops (ICCVW), pp. 426-435, 2023.
Soumyadip Sengupta, Angjoo Kanazawa, Carlos D. Castillo, and David W. Jacobs. "SfSNet: Learning Shape, Reflectance and Illuminance of Faces in the Wild". In Conference on Computer Vision and Pattern Recognition (CVPR), pp. 6296-6305, 2018.
Sreenithy Chandran, Yannick Hold-Geoffroy, Kalyan Sunkavalli, Zhixin Shu, and Suren Jayasuriya. "Temporally Consistent Relighting for Portrait Videos". In IEEE/CVF Winter Conference on Applications of Computer Vision (WACV), pp. 719-728, Jan. 2022.
Thomas Nestmeyer, Jean-Francois Lalonde, lain Matthews, and Andreas Lehrmann. "Learning Physics-guided Face Relighting under

(56) References Cited

OTHER PUBLICATIONS

Directional Light". In Conference on Computer Vision and Pattern Recognition (CVPR), pp. 5124-5133, Jun. 2020.
Tiancheng Sun, Jonathan T Barron, Yun-Ta Tsai, Zexiang Xu, Xueming Yu, Graham Fyffe, Christoph Rhemann, Jay Busch, Paul Debevec, and Ravi Ramamoorthi. "Single Image Portrait Relighting". ACM Transactions on Graphics (TOG), 33, 12 pages, Jul. 2019.
Tiancheng Sun, Kai-En Lin, Sai Bi, Zexiang Xu, and Ravi Ramamoorthi. "NeLF: Neural Light-transport Field for Portrait View Synthesis and Relighting". In European Symposium on Rendering (EGSR), 12 pages, arXiv preprint arXiv:2107.12351v1, Jul. 26, 2021.
Umar Iqbal, Akin Caliskan, Koki Nagano, Sameh Khamis, Pavlo Molchanov, and Jan Kautz. "RANA: Relightable Articulated Neural Avatars". In IEEE/CVF International Conference on Computer Vision (ICCV), pp. 23142-23153, 2023.
Utkarsh Ojha, Yuheng Li, and Yong Jae Lee. "Towards Universal Fake Image Detectors that Generalize Across Generative Models". In Conference on Computer Vision and Pattern Recognition (CVPR), pp. 24480-24489, Jun. 2023.
Vishal Asnani, Xi Yin, Tal Hassner, and Xiaoming Liu. "MaLP: Manipulation Localization Using a Proactive Scheme". In Conference on Computer Vision and Pattern Recognition (CVPR), pp. 12343-12352, 2023.
Vishal Asnani, Xi Yin, Tal Hassner, and Xiaoming Liu. "Reverse Engineering of Generative Models: Inferring Model Hyperparameters from Generated Images". In IEEE Transactions on Pattern Analysis and Machine Intelligence (PAMI), 45(12), pp. 15477-15493, Dec. 12, 2023.
Xiao Guo, Xiaohong Liu, Zhiyuan Ren, Steven Grosz, Iacopo Masi, and Xiaoming Liu. "Hierarchical Fine-Grained Image Forgery Detection and Localization". In Conference on Computer Vision and Pattern Recognition (CVPR), pp. 3155-3165, 2023.
Xingchao Yang and Takafumi Taketomi. "BareSkinNet: De-makeup and De-lighting via 3D Face Reconstruction". In Computer Graphics Forum (CGF), 41(7), 12 pages, arXiv preprint arXiv:2209.09029v1, Sep. 19, 2022.
Xiuming Zhang, Sean Fanello, Yun-Ta Tsai, Tiancheng Sun, Tianfan Xue, Rohit Pandey, Sergio Orts-Escolano, Philip Davidson, Christoph Rhemann, Paul Debevec, Jonathan T. Barron, Ravi Ramamoorthi, and William T. Freeman."Neural Light Transport for Relighting and View Synthesis". ACM Transactions on Graphics (TOG), 40(1), pp. 1-17, Jan. 2021.
Xuaner Zhang, Jonathan T. Barron, Yun-Ta Tsai, Rohit Pandey, Xiuming Zhang, Ren Ng, and David E. Jacobs. "Portrait Shadow Manipulation". ACM Transactions on Graphics (TOG), 39(4), 14 pages, Aug. 2020.
Yannick Hold-Geoffroy, Akshaya Athawale, and Jean- Francois Lalonde. "Deep Sky Modeling for Single Image Outdoor Lighting Estimation". In Conference on Computer Vision and Pattern Recognition (CVPR), pp. 6927-6935, 2019.
Yaojie Liu, Andrew Hou, Xinyu Huang, Liu Ren, and Xiaoming Liu. "Blind Removal of Facial Foreign Shadows". In British Machine Vision Conference (BMVC), 14 pages. 2022.
YiChang Shih, Sylvain Paris, Connelly Barnes, William T. Freeman, and Fredo Durand. "Style Transfer for Headshot Portraits". SIGGRAPH, 14 pages, Jul. 2014.
Yifan Wang, Aleksander Holynski, Xiuming Zhang, and Xuaner Zhang. "Sunstage: Portrait Reconstruction and Relighting using the Sun as a Light Stage". In Conference on Computer Vision and Pattern Recognition (CVPR), pp. 20792-20802, Jun. 2023.
Yingqing He, Yazhou Xing, Tianjia Zhang, and Qifeng Chen. "Unsupervised Portrait Shadow Removal via Generative Priors". In Proceedings of the 29th ACM Int'l Conference on Multimedia (MM), 9 pages, Oct. 2021.
Yiqun Mei, He Zhang, Xuaner Zhang, Jianming Zhang, Zhixin Shu, Yilin Wang, Zijun Wei, Shi Yan, HyunJoon Jung, and Vishal M. Patel. "LightPainter: Interactive Portrait Relighting with Freehand Scribble". In Conference on Computer Vision and Pattern Recognition (CVPR), pp. 195-205, Jun. 2023.
Yu-Ying Yeh, Koki Nagano, Sameh Khamis, Jan Kautz, Ming-Yu Liu, and Ting-Chun Wang. "Learning to Relight Portrait Images via a Virtual Light Stage and Synthetic-to- Real Adaptation". ACM Transactions on Graphics (TOG), 41(6), pp. 1-21, Nov. 2022.
Zheng Ding, Cecilia Zhang, Zhihao Xia, Lars Jebe, Zhuowen Tu, and Xiuming Zhang. "DiffusionRig: Learning Personalized Priors for Facial Appearance Editing". In Conference on Computer Vision and Pattern Recognition (CVPR), pp. 12736-1746, 2023.
Zhibo Wang, Xin Yu, Ming Lu, QuanWang, Chen Qian, and Feng Xu. "Single Image Portrait Relighting via Explicit Multiple Reflectance Channel Modeling". ACM Transactions on Graphics (TOG), 39(6), 13 pages, Dec. 2020.
Zhixin Shu, Sunil Hadap, Eli Shechtman, Kalyan Sunkavalli, Sylvain Paris, and Dimitris Samaras. "Portrait Lighting Transfer Using a Mass Transport Approach". ACM Transactions on Graphics (TOG), 37(1), 15 pages, Oct. 2017.
Zhou Wang, Alan C Bovik, Hamid R Sheikh, and Eero P Simoncelli. "Image Quality Assessment: From Error Visibility to Structural Similarity". In IEEE Transactions on Image Processing (TIP), (31(4), 14 pages, Apr. 2004.

* cited by examiner

602

604

606

EDITING SHADOWS IN DIGITAL IMAGES UTILIZING MACHINE LEARNING MODELS

BACKGROUND

Recent years have seen a rapid increase in the use of digital graphics tools to create or modify digital content. Indeed, individuals and businesses increasingly utilize digital graphics tools to edit digital images. For example, with the increased availability of mobile devices having built-in cameras, many individuals and businesses produce portrait images and utilize digital graphics tools to edit those portrait images. Although conventional digital content modification systems often modify images, these conventional systems have several shortcomings with regard to accuracy and flexibility in editing images, particularly editing complex content like shadows.

BRIEF SUMMARY

Embodiments of the present disclosure provide benefits and/or solve one or more problems in the art with systems, non-transitory computer-readable media, and methods for editing shadows in digital images (e.g., portrait images) utilizing deep learning. The disclosed systems predict lighting of a digital image as an environment map. The disclosed systems estimate the dominant light (shadow) parameters from the environment map. The systems allows a user to modify one or more of the dominant light parameters (e.g., intensity, size, or position). The systems remove the shadows from the digital image to generate a diffused, albedo-like image. The systems generate a modified digital image with synthesized shadows based on the diffused, albedo-like image and the modified dominant light parameters. Thus, the disclosed shadow synthesis process is adaptable, accepting various shadow-related parameters for controllable shadow synthesis.

The following description sets forth additional features and advantages of one or more embodiments of the disclosed methods, non-transitory computer-readable media, and systems. In some cases, such features and advantages are evident to a skilled artisan having the benefit of this disclosure, or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
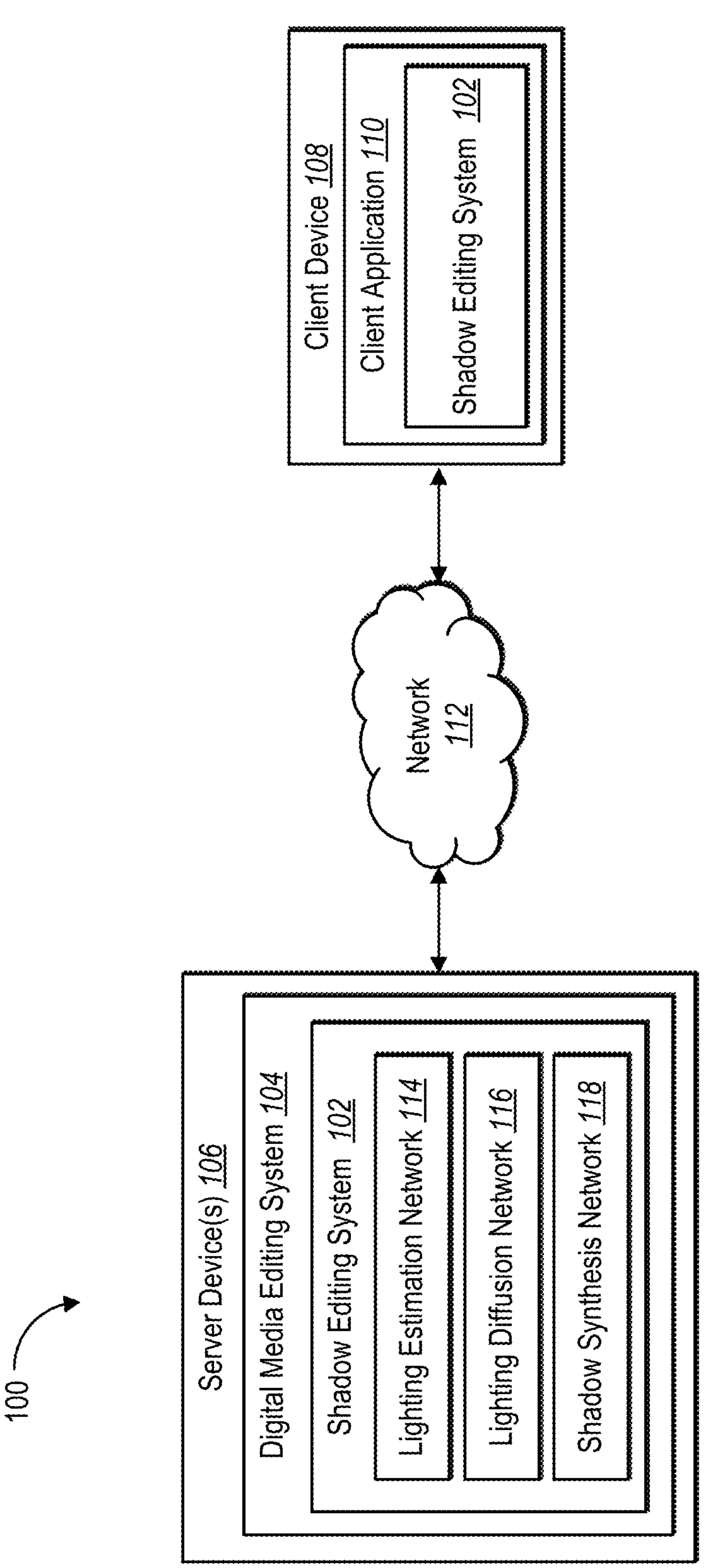
FIG. 1 illustrates a diagram of an environment in which a shadow editing system operates in accordance with one or more embodiments.

This disclosure describes one or more embodiments of a shadow editing system that modifies shadows in digital images utilizing deep learning. For example, the shadow editing system edits portraits to update, correct, or otherwise change one or more shadows in the portraits. In various embodiments, the shadow editing system utilizes machine learning models to edit shadows in digital images. Specifically, the shadow editing system provides a four-stage pipeline comprising lighting estimation and editing, light diffusion, shadow synthesis, which all result in shadow editing.

More specifically, the shadow editing system separates shadows from lighting representation. Once separated, the shadow editing system enables flexible manipulation of shadow attributes (e.g., position (lighting direction), smoothness, and intensity). Specifically, the shadow editing system generates divides lighting effects into a shadow component and an ambient lighting component. The shadow editing system simplifies the shadow component by attributing the shadow component to one or more dominant light sources on an environment map. Specifically, in one or more embodiments, the shadow component is encoded using a gaussian with shadow parameters representing the light position, size (e.g., spread or diffusion), and light intensity. The remaining lighting effects are attributed to a diffused environment map, modeling the ambient lighting in the image.

To edit the shadows in an image, the shadow editing system predicts the lighting image as an environment map. The shadow editing system estimates the dominant light (shadow) parameters from the environment map. The shadow editing system allows a user to modify one or more of the dominant light parameters (e.g., intensity, size, or position). The shadow editing system removes the shadows from the digital image to generate a diffused, albedo-like image. The shadow editing system generates a modified digital image by synthesizing shadows from the diffused, albedo-like image and the modified dominant light parameters. The shadow editing system provides an adaptable shadow synthesis process that accepts various shadow-related parameters for controlling the shadow synthesis. Furthermore, in one or more implementations, the shadow editing system blends synthesized shadows with the diffuse lighting to create shadows of varying intensities.

To illustrate, in some implementations, the shadow editing system utilizes a lighting estimation network to determine an environment map for a digital image. In one or more implementations, the environment map models a dominant light that illuminates the digital image. Additionally, in some embodiments, the shadow editing system utilizes a lighting diffusion network to generate a diffused image from the digital image. For example, the shadow editing system generates a diffused image depicting smoothed shading for the digital image. Moreover, in some implementations, the shadow editing system utilizes a shadow synthesis network to generate a shadowed image from the diffused image. For instance, the shadow editing system generates a shadowed image based on one or more a modified dominant lighting parameters. Furthermore, in some implementations, the shadow editing system composites the diffused image and the shadowed image to generate a modified digital image that has an edited shadow for the digital image.

As described in additional detail below, in some implementations, the shadow editing system treats shadows in a digital image as a composable lighting effect. For example, the shadow editing system independently predicts and alters shadows for a specific face image in a portrait. For instance, the shadow editing system integrates a shadow representation into an overall lighting representation of the digital image. In some embodiments, the shadow editing system predicts the shadow from the image and applies a controllable shadow onto a shadow-free face image. Within this framework, the shadow editing system determines properties of shadows that a user manipulates via a client device, such as shadow position, shadow intensity, and/or shadow shape. By connecting these shadow properties to lighting attributes for the digital image, the shadow editing system offers control of shadow appearances in the digital image.

Existing portrait relighting systems suffer from several deficiencies. For example, existing systems struggle to offer control over facial shadows, particularly when faced with challenging images, such as images with hard shadows from direct lighting sources. In addition, existing systems often offer limited lighting control options, such as shadow softening only.

Moreover, existing systems often are unable to adjust shadows on an image subject while retaining the existing lighting conditions in the image background. In many portrait retouching applications, existing systems completely alter the lighting conditions for a whole image. For instance, existing systems often change both subject lighting and background lighting, thereby altering the overall visual cues of the image.

By contrast, the shadow editing system provides a variety of improvements relative to existing systems. For example, the shadow editing system offers precise control over multiple lighting parameters, including shadow intensity, shape/size, and position. For instance, the shadow editing system utilizes shadow synthesis (as described in detail below) to add lighting effects including position, shape, and intensity to a diffused image.

Moreover, the shadow editing system preserves authenticity in the captured environment of a digital image by retaining ambient lighting for the digital image, while adjusting lighting on a subject of the image. For example, the shadow editing system utilizes lighting diffusion (as described in detail below) to capture the ambient conditions of the digital image and preserve those conditions for the modified digital image. Thus, the shadow editing system focuses shadow editing on the image subject, and thereby preserves the overall visual effect of the digital image.

Additional detail will now be provided in relation to illustrative figures portraying example embodiments and implementations of a shadow editing system. For example, FIG. 1 illustrates a system 100 (or environment) in which a shadow editing system 102 operates in accordance with one or more embodiments. As illustrated, the system 100 includes server device(s) 106, a network 112, and a client device 108. As further illustrated, the server device(s) 106 and the client device 108 communicate with one another via the network 112.

As shown in FIG. 1, the server device(s) 106 includes a digital media editing system 104 that further includes the shadow editing system 102. In some embodiments, the shadow editing system 102 generates a modified digital image comprising an edited shadow for a digital image. In some embodiments, the shadow editing system 102 utilizes one or more machine learning models (such as a lighting estimation network 114, a lighting diffusion network 116, and/or a shadow synthesis network 118) to generate a modified digital image comprising modified shadows. In some embodiments, the server device(s) 106 includes, but is not limited to, a computing device (such as explained below with reference to FIG. 12).

A machine learning model includes a computer representation that is tunable (e.g., trained) based on inputs to approximate unknown functions used for generating corresponding outputs. In particular, in one or more embodiments, a machine learning model is a computer-implemented model that utilizes algorithms to learn from, and make predictions on, known data by analyzing the known data to learn to generate outputs that reflect patterns and attributes of the known data. For instance, in some cases, a machine learning model includes, but is not limited to, a neural network (e.g., a convolutional neural network, recurrent neural network, or other deep learning network), a decision tree (e.g., a gradient boosted decision tree), support vector learning, Bayesian networks, a transformer-based model, a diffusion model, or a combination thereof.

Similarly, a neural network includes a machine learning model that is trainable and/or tunable based on inputs to determine classifications and/or scores, or to approximate unknown functions. For example, in some cases, a neural network includes a model of interconnected artificial neurons (e.g., organized in layers) that communicate and learn to approximate complex functions and generate outputs based on inputs provided to the neural network. In some cases, a neural network refers to an algorithm (or set of algorithms) that implements deep learning techniques to model high-level abstractions in data. A neural network includes various layers such as an input layer, one or more hidden layers, and an output layer that each perform tasks for processing data. For example, a neural network includes a deep neural network, a convolutional neural network, a diffusion neural network, a recurrent neural network (e.g., an LSTM), a graph neural network, a transformer, or a generative adversarial neural network.

In some instances, the shadow editing system 102 receives a request (e.g., from the client device 108) to edit a shadow in a digital image. For example, the shadow editing system 102 receives the digital image with a request to modify an intensity, a size, and/or a position of a shadow in the digital image. In some embodiments, the server device(s) 106 perform a variety of functions via the digital media editing system 104 on the server device(s) 106. To illustrate, the server device(s) 106 (through the shadow editing system 102 on the digital media editing system 104) performs functions such as, but not limited to, determining an environment map for a digital image, generating a diffused image from the digital image, generating a shadowed image from the diffused image, and generating a modified digital image. In some embodiments, the server device(s) 106 utilizes the lighting estimation network 114, the lighting diffusion network 116, and/or the shadow synthesis network 118 to generate the environment map, the diffused image, the shadowed image, and/or the modified digital image. In some embodiments, the server device(s) 106 trains the lighting estimation network 114, the lighting diffusion network 116, and/or the shadow synthesis network 118.

Furthermore, as shown in FIG. 1, the system 100 includes the client device 108. In some embodiments, the client device 108 includes, but is not limited to, a mobile device (e.g., a smartphone, a tablet), a laptop computer, a desktop computer, or any other type of computing device, including those explained below with reference to FIG. 12. Some embodiments of client device 108 perform a variety of functions via a client application 110 on client device 108. For example, the client device 108 (through the client application 110) performs functions such as, but not limited to, determining an environment map for a digital image, generating a diffused image from the digital image, generating a shadowed image from the diffused image, and generating a modified digital image. In some embodiments, the client device 108 utilizes the lighting estimation network 114, the lighting diffusion network 116, and/or the shadow synthesis network 118 to generate the environment map, the diffused image, the shadowed image, and/or the modified digital image. In some embodiments, the client device 108 trains the lighting estimation network 114, the lighting diffusion network 116, and/or the shadow synthesis network 118.

To access the functionalities of the shadow editing system 102 (as described above and in greater detail below), in one or more embodiments, a user interacts with the client application 110 on the client device 108. For example, the client application 110 includes one or more software applications (e.g., to interact with digital images in accordance with one or more embodiments described herein) installed on the client device 108, such as a digital media editing application and/or an image access application. In certain instances, the client application 110 is hosted on the server device(s) 106. Additionally, when hosted on the server device(s) 106, the client application 110 is accessed by the client device 108 through a web browser and/or another online interfacing platform and/or tool. Furthermore, in some embodiments, the client device 108, the server device(s) 106, or another system host one or more databases including digital data.

As illustrated in FIG. 1, in some embodiments, the shadow editing system 102 is part of a client application 110 on the client device 108 (e.g., additionally, or alternatively to being hosted by the digital media editing system 104 on the server device(s) 106). For example, the shadow editing system 102 performs the shadow editing techniques described herein on the client device 108. In some implementations, the shadow editing system 102 utilizes the server device(s) 106 to train and implement machine learning models (such as the lighting estimation network 114, the lighting diffusion network 116, and/or the shadow synthesis network 118) and utilizes the client device 108 to implement or apply the machine learning models.

Further, although FIG. 1 illustrates the shadow editing system 102 being implemented by a particular component and/or device within the system 100 (e.g., the server device(s) 106 and/or the client device 108), in some embodiments the shadow editing system 102 is implemented, in whole or in part, by other computing devices and/or components in the system 100. For instance, in some embodiments, the shadow editing system 102 is implemented on another client device. More specifically, in one or more embodiments, the description of (and acts performed by) the shadow editing system 102 are implemented by (or performed by) the client application 110 on another client device.

In some embodiments, the client application 110 includes a web hosting application that allows the client device 108 to interact with content and services hosted on the server device(s) 106. To illustrate, in one or more implementations, the client device 108 accesses a web page or computing application supported by the server device(s) 106. The client device 108 provides input to the server device(s) 106 (e.g., a digital image and/or a shadow editing request). In response, the shadow editing system 102 on the server device(s) 106 performs operations described herein to edit a shadow of the digital image. The server device(s) 106 provides the output or results of the operations (e.g., a modified digital image with the edited shadow) to the client device 108. As another example, in some implementations, the shadow editing system 102 on the client device 108 performs operations described herein to edit a shadow of the digital image. The client device 108 provides the output or results of the operations (e.g., a modified digital image with the edited shadow) via a display of the client device 108, and/or transmits the output or results of the operations to another device (e.g., the server device(s) 106 and/or another client device).

Additionally, as shown in FIG. 1, the system 100 includes the network 112. As mentioned above, in some instances, the network 112 enables communication between components of the system 100. In certain embodiments, the network 112 includes a suitable network and communicates using any communication platforms and technologies suitable for transporting data and/or communication signals, examples of which are described with reference to FIG. 12. Furthermore, although FIG. 1 illustrates the server device(s) 106 and the client device 108 communicating via the network 112, in certain embodiments, the various components of the system 100 communicate and/or interact via other methods (e.g., the server device(s) 106 and the client device 108 communicate directly).

As discussed above, in some embodiments, the shadow editing system 102 generates a modified digital image with an edited shadow from a digital image. For instance, FIG. 2 illustrates the shadow editing system 102 utilizing machine learning models to generate the modified digital image in accordance with one or more embodiments.

Figure 2:
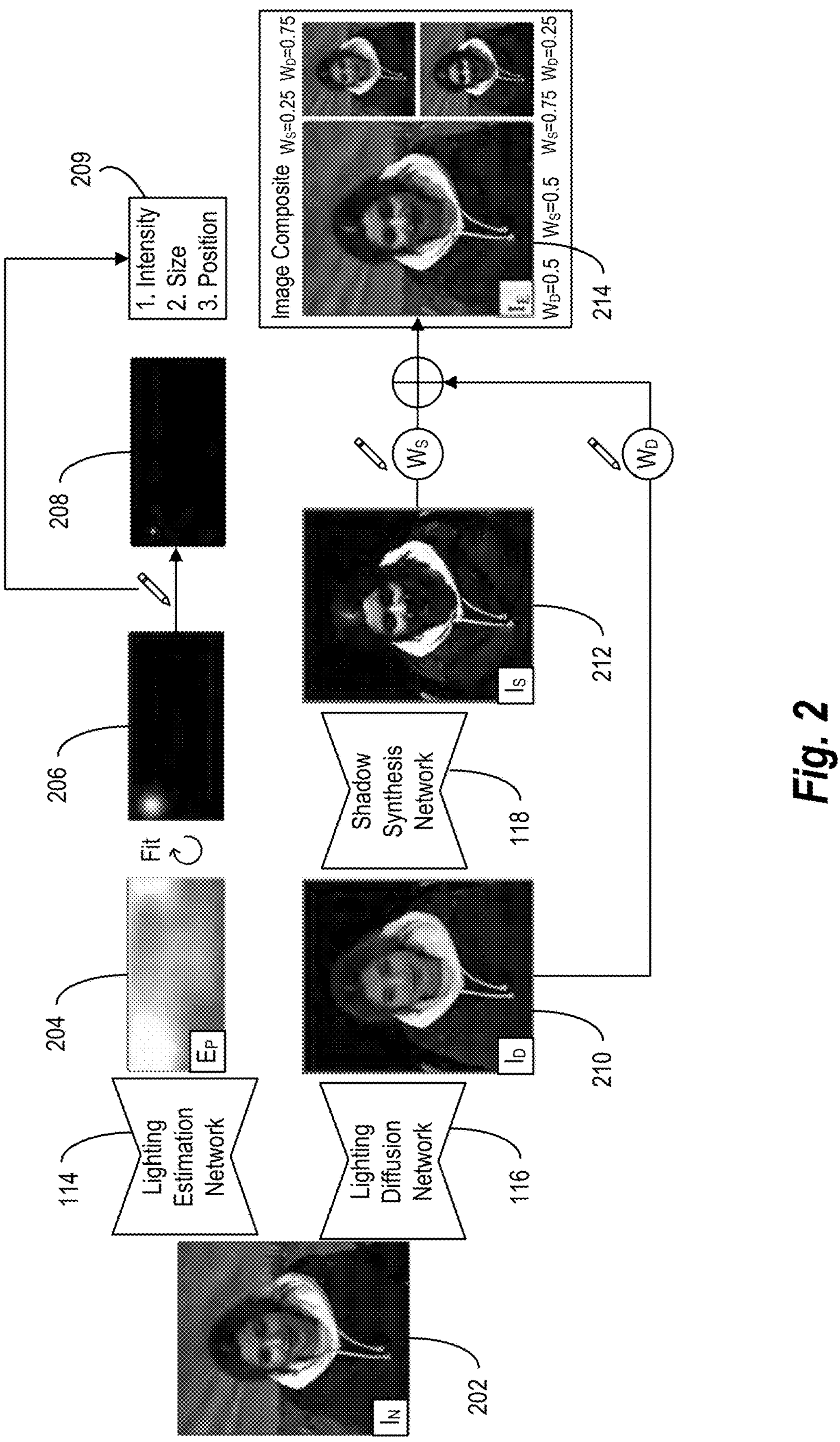
FIG. 2 illustrates the shadow editing system utilizing lighting estimation, lighting diffusion, shadow synthesis, and image composition to edit shadows of a digital image in accordance with one or more embodiments.

In particular, FIG. 2 shows the shadow editing system 102 obtaining a digital image 202. In some embodiments, a digital image includes a portrait or photograph depicting one or more people or other subjects. In some cases, the digital image 202 includes a shadow on the one or more subjects. For example, in some cases, the digital image 202 includes hard shadows on a portion of the subject and/or specular highlights visible on the subject. In some embodiments, the shadow editing system 102 receives a request to edit the shadow of the digital image 202. For example, the shadow editing system 102 receives a request to remove hard shadows and/or specular highlights from the digital image 202.

As also shown in FIG. 2, in some implementations, the shadow editing system 102 utilizes the lighting estimation network 114 to estimate an environment map 204 for the digital image 202. In some embodiments, an environment map includes a digital representation of one or more light sources. In particular embodiments, an environment map represents spherical, cylindrical, or omnidirectional distant lighting where each pixel of the environment map comprises an incidental directional radiance (e.g., the incident radiance from a direction with a finite solid angle relative to a surface point of a virtual object). To illustrate, the shadow editing system 102 determines the environment map 204 with one or more lights. In some cases, the environment map 204 includes a dominant light. For instance, an environment map for a digital image portraying a daytime outdoor scene often includes a dominant light from the sun.

Furthermore, as shown in FIG. 2, in some embodiments, the shadow editing system 102 fits the dominant light on the environment map 204. For example, the shadow editing system 102 models the environment map 204 (and its dominant light) as a light source 206 comprising a single light. For instance, in some implementations, the shadow editing system 102 fits the environment map 204 to the light source 206 as a two-dimensional isotropic Gaussian distribution. In other words, in some implementations, the shadow editing system 102 converts nonparametric information for the dominant light (e.g., lighting information stored in the environment map 204) into parametric information for the dominant light (e.g., position, size, and intensity parameters stored in the light source 206).

As just mentioned, in some implementations, the shadow editing system 102 represents the dominant light in the light source 206 with lighting parameters for position (x, y), size $\sigma$, and/or intensity $\gamma$ of the dominant light. In some embodiments, the position is determined in rectangular coordinates. In alternative embodiments, the position is determined in cylindrical, spherical, or other coordinate systems. In some embodiments, the shadow editing system 102 determines a three-dimensional intensity of the dominant light. For instance, in some cases, the dominant light includes color, and the shadow editing system 102 determines a three-channel color intensity (e.g., RGB) for the dominant light.

As mentioned, in some implementations, the shadow editing system 102 allows for modification of the dominant light. For instance, based on a request to edit a shadow of the digital image 202, the shadow editing system 102 determines a modified environment map 208 with a modified dominant light. To illustrate, in some embodiments, the shadow editing system 102 changes one or more lighting parameters 209 (e.g., an intensity, a size, or a position of the dominant light) to generate the modified dominant light. Additionally, in some implementations, the shadow editing system 102 determines the modified environment map 208 with both the modified dominant light and a new dominant light. For example, in some implementations, the shadow editing system 102 utilizes a modified environment map 208 (e.g., to generate a shadowed image) that has two (or more) dominant lights.

In addition, in some embodiments, the shadow editing system 102 utilizes the lighting diffusion network 116 to generate a diffused image 210 from the digital image 202. In some cases, the diffused image 210 has smoothed shading. For example, in some implementations, the shadow editing system 102 processes the digital image 202 through the lighting diffusion network 116 to remove specular highlights and/or hard shadows, thereby smoothing the shading of the digital image 202 to generate the diffused image 210. To illustrate, the shadow editing system 102 generates the diffused image 210 as an ambient-lighted image (e.g., an image without a dominant light).

Moreover, in some embodiments, the shadow editing system 102 utilizes the shadow synthesis network 118 to generate a shadowed image 212 from the diffused image 210. More particularly, in some implementations, the shadow editing system 102 generates the shadowed image 212 from the diffused image 210 and the modified environment map 208. For instance, the shadow editing system 102 utilizes the shadow synthesis network 118 to generate an updated shadow for the digital image 202 and apply the updated shadow to the diffused image 210. For example, the shadow editing system 102 generates the shadowed image 212 based on parameters of the modified dominant light in the modified environment map 208. To illustrate, in some embodiments, the shadow editing system 102 generates the shadowed image 212 from the diffused image 210 and the modified environment map 208 by generating a dominant-lighted image (e.g., an image with at least one dominant light).

Additionally, in some implementations, the shadow editing system 102 generates a modified digital image 214 from the diffused image 210 and the shadowed image 212. For example, the shadow editing system 102 combines the diffused image 210 and the shadowed image 212 as a composite image. In some embodiments, the shadow editing system 102 generates one or more modified digital images based on various weights for the diffused image 210 and the shadowed image 212. For example, in some embodiments, the shadow editing system 102 provides the modified digital images for display via a graphical user interface of a client device, from which a user has an option to select one or more of the modified digital images.

To illustrate symbolically, the shadow editing system 102 determines a modified (edited) digital image $I_E$ from a source (nonedited) digital image $I_N$ as follows:

$$I_E = F_\theta(I_N, x, y, \sigma, \gamma)$$

where $F_\theta$ represents the shadow editing techniques described above and x and y are the position of the dominant light on the environment map, $\sigma$ is the light size, and $\gamma$ is the light intensity.

The techniques of the shadow editing system 102 described above will now be described in further detail, with continued reference to FIG. 2. As mentioned, in some implementations, the shadow editing system 102 generates shadow representations for a particular digital image (e.g., a particular face in a portrait or other photograph) based on adjustments to lighting parameters 209 for a scene of the digital image. For instance, the shadow editing system 102 utilizes shadow properties (e.g., shadow position, shadow intensity, and/or shadow shape) that a user manipulates to control lighting attributes in a portrait. In some embodiments, the shadow editing system 102 utilizes a four-stage shadow editing framework that includes lighting estimation, lighting diffusion, shadow synthesis, and image composition. As mentioned, in some implementations, the shadow editing system 102 edits a shadow for a single digital image, without a need for additional input (e.g., without a need for multiple input images or video stream).

In the lighting estimation stage, the shadow editing system 102 utilizes the lighting estimation network 114 to estimate the environment map 204. As used herein, and environment map encodes illumination properties of the environment in which a digital image was captured at the time it was captured. For example, an environment map records incident light arriving from all directions at a point (e.g., the location of the camera). In one or more embodiments, the environment map is low-dynamic range ("LDR") having ratio equal to or less than 256:1. In alternative implementations, the environment map is high-dynamic range ("HDR") having ratio equal to or greater than 256:1.

In one or more embodiments, the environment map is panoramic (e.g., has an enlarged field-of-view (e.g., horizontally, vertically, and/or diagonally)). As used herein, a panoramic environment map portrays greater than 180 degrees of a horizontal field-of-view and/or greater than 90 degrees of a vertical field-of-view. For instance, a spherical image or 360-degree environment map is an example of a panoramic environment map.

In some embodiments, the shadow editing system 102 utilizes a variational autoencoder as the lighting estimation network 114. In some embodiments, the shadow editing system 102 estimates the dominant light from the environment map 204 to determine the light source 206. For example, from the environment map 204, the shadow editing system 102 estimates a position of the most prominent light illuminating a portrait scene of the digital image 202. In some cases, the dominant light represents the brightest intensity on an image-based lighting (IBL) representation. Moreover, in some implementations, the shadow editing system 102 determines the dominant light by fitting a two-dimensional isotropic Gaussian distribution to the dominant light on the environment map 204.

To illustrate, in some embodiments, the shadow editing system 102 determines parameters for the dominant light. In some cases, the lighting parameters include position (e.g., a two-dimensional position), size, and intensity. For instance, the shadow editing system 102 determines a center position for the Gaussian distribution on the light source 206 to represent the position of the dominant light on the environment map 204. Similarly, the shadow editing system 102 determines a width (e.g., a standard deviation) of the Gaussian distribution to represent a size of the dominant light. Likewise, the shadow editing system 102 determines a height (e.g., a magnitude) of the Gaussian distribution to represent an intensity of the dominant light.

In some cases, the estimated lighting parameters correspond with shadow information in the input digital image 202, and is thus useful for shadow editing (e.g., shadow softening, shadow intensifying). Thus, in some implementations, the shadow editing system 102 offers portrait editing in which existing shadows are changed, while preserving the ambient lighting of the image.

In the lighting diffusion stage, in some implementations, the shadow editing system 102 utilizes the lighting diffusion network 116 to remove existing hard shadows (e.g., sharp contrasts between a shaded portion of a face and a lit portion of the face) and specular highlights (e.g., bright patches of light of a face) from the digital image 202. For example, the shadow editing system 102 generates the diffused image 210, which has smoothed shading. Thus, in some cases, the diffused image 210 represents the scene (e.g., the portrait) of the digital image 202 under only ambient illumination conditions.

In some embodiments, the shadow editing system 102 utilizes a hierarchical transformer encoder as the lighting diffusion network 116. For example, the shadow editing system 102 processes the digital image 202 through the hierarchical transformer encoder to generate multi-level features, and processes the multi-level features through a decoder with transposed convolutional layers to generate the diffused image 210. In some embodiments, the shadow editing system 102 also processes a body parsing mask and a binary foreground mask for the digital image 202 through the lighting diffusion network 116. The hierarchical transformer encoder as the lighting diffusion network 116 handles removing effects of shadows at all scales better than other architectures such as U-Net.

In the shadow synthesis stage, in some embodiments, the shadow editing system 102 utilizes the shadow synthesis network 118 to generate the shadowed image 212. To illustrate, the shadow editing system 102 generates the shadowed image 212 from the diffused image 210 with an edited light source. For example, the shadow editing system 102 generates the edited light source based on a selected intensity, size, and/or position for the modified dominant light in the modified environment map 208.

As mentioned, in some implementations, the shadow editing system 102 provides control over the shadows shown in output digital images by providing techniques for adjusting lighting parameters for the output digital images. In particular, in various embodiments, the shadow editing system 102 adjusts one or more parameters for a Gaussian distribution representing the dominant light. For instance, by moving the center point of the Gaussian distribution, the shadow editing system 102 changes the position of the dominant light. Relatedly, by changing the standard deviation of the Gaussian distribution, the shadow editing system 102 changes the size of the dominant light. For example, a larger standard deviation represents a larger, more diffuse light. Similarly, by adjusting the height of the Gaussian distribution (e.g., multiplying the Gaussian with a scalar), the shadow editing system 102 changes the intensity of the dominant light. For instance, a larger magnitude represents a brighter light. Thus, in some implementations, the shadow editing system 102 determines the modified environment map 208 to represent the modified dominant light.

In addition, in some implementations, the shadow editing system 102 provides an option to add multiple dominant lights. For instance, in addition to the modified dominant light, the shadow editing system 102 includes a new dominant light in the modified environment map 208. For example, a user both changes the dominant light of the environment map 204 and adds an additional dominant light.

Moreover, as mentioned, in some embodiments, the shadow editing system 102 utilizes the modified environment map 208 and the diffused image 210 to generate the shadowed image 212. In some implementations, the shadow editing system 102 utilizes a U-Net model as the shadow synthesis network 118. For example, the shadow editing system 102 normalizes and channelizes the parameters of the modified dominant light (e.g., two-dimensional position, size, and intensity) for the U-Net model. For instance, the shadow editing system 102 normalizes each parameter between zero and one and repeats each parameter spatially as 32×32 channels.

Moreover, in some embodiments, the shadow editing system 102 utilizes the U-Net model followed by a denoising diffusion probabilistic model (DDPM) as the shadow synthesis network 118. In some cases, the shadow editing system 102 utilizes the DDPM to refine the image produced by the U-Net.

In some cases, by modeling the modified dominant light as a point light with four parameters, the shadow editing system 102 provides increased computational efficiency by reducing the inputs to the shadow synthesis network 118. In particular, by simplifying the input (e.g., by utilizing the four parameters of the modified dominant light as the modified environment map 208 instead of retaining all information contained in the initial environment map 204), the shadow editing system 102 provides for faster computational convergence of the shadow synthesis network 118 and reduced storage demand on memory systems.

Furthermore, in some implementations, the shadow editing system 102 processes the diffused image 210 and the modified environment map 208 through the shadow synthesis network 118 to generate a relit image: the shadowed image 212. In some embodiments, the shadow editing system 102 refines the shadowed image 212 utilizing a PatchGAN discriminator. For instance, the shadow editing system 102 utilizes the PatchGAN discriminator to improve image quality and the realism of the synthesized shadows. In various implementations, the PatchGAN discriminator utilizes a patch-based architecture that includes both a local discriminator. For example, the PatchGAN architecture determines and penalizes differences based on changes at local image patches. Indeed, in some implementations, the PatchGAN discriminator classifies each patch within a digital image as real or fake, then averages the classifications across the patches to provide a final input.

As mentioned, in some embodiments, the shadow editing system 102 determines a modified environment map with multiple dominant lights. Thus, in some embodiments, the shadow editing system 102 generates the shadowed image 212 by utilizing the shadow synthesis network 118 to apply each dominant light (e.g., both the modified dominant light and the new dominant light) to the diffused image.

In the image composition stage, the shadow editing system 102 combines the diffused image 210 and the shadowed image 212 to generate the modified digital image 214. For example, the shadow editing system 102 composites the diffused image 210 and the shadowed image 212 weighted linear sum. To illustrate, the shadow editing system 102 generates the modified digital image 214 (the final edited image $I_E$) as:

$$I_E = \omega_D I_D + \omega_S I_S$$

where $\omega_D$ is a weight for the diffused image $I_D$ and $\omega_S$ is a weight for the shadowed image $I_S$. In some implementations, the weights sum to unity: $\omega_D+\omega_S=1$. By adjusting the weights, the shadow editing system 102 tunes the shadow intensity of the modified digital image 214. For example, a higher weight for the diffused image 210 softens the resulting shadow on the modified digital image 214, whereas a higher weight for the shadowed image 212 results in a darker shadow on the modified digital image 214.

Figure 3:
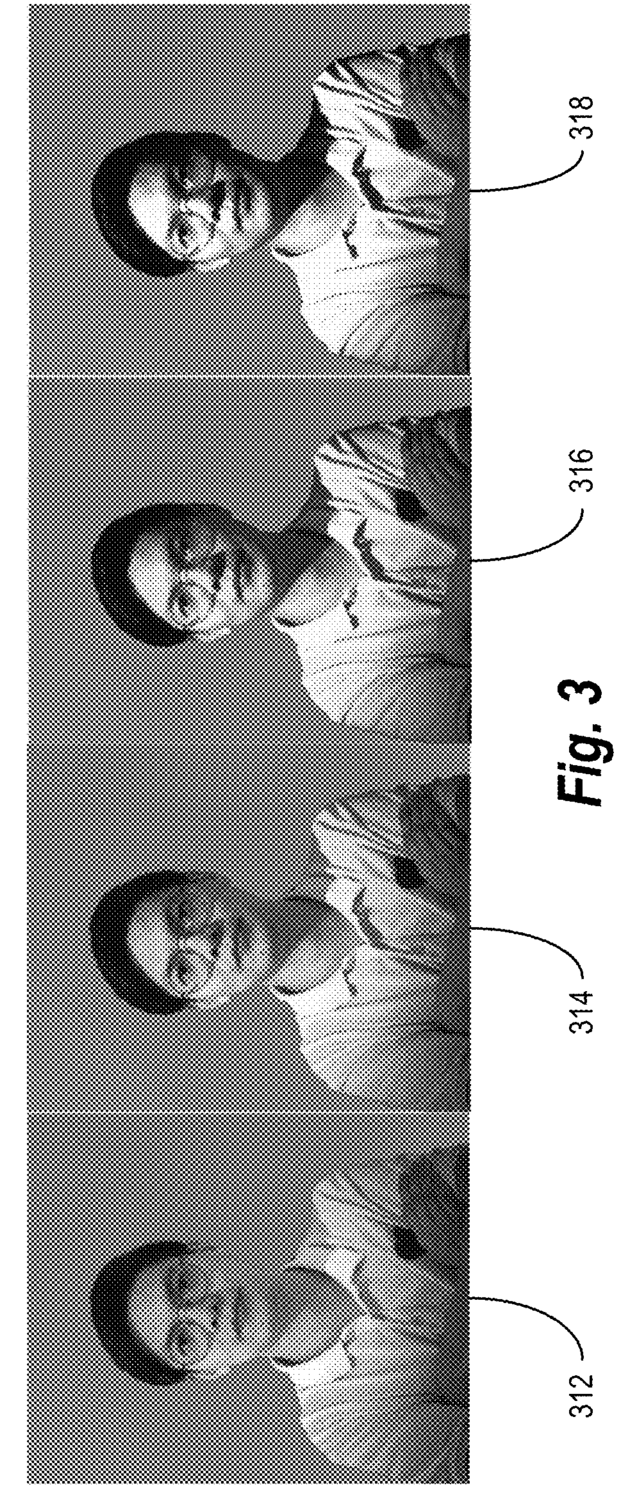
FIG. 3 illustrates edits of an intensity of a portrait shadow by the shadow editing system in accordance with one or more embodiments.

FIG. 3 illustrates the shadow editing system 102 editing an intensity of a portrait shadow in accordance with one or more embodiments. Specifically, FIG. 3 shows a diffused image 302 and a shadowed image 304 (e.g., both resulting from the same input portrait). Additionally, FIG. 3 shows various modified digital images 312-318 as outputs of the image composition stage. For example, the modified digital image 312 has soft shadows on the portrait, whereas the modified digital image 318 has dark shadows on the portrait. As intermediate examples, the modified digital image 314 has darker shadows than the modified digital image 312, and the modified digital image 316 has darker shadows than the modified digital image 314 yet softer shadows than the modified digital image 318. In each case, the shadow editing system 102 generates the modified digital image based on respective weights for the diffused image 302 and a shadowed image 304. In some embodiments, the shadow editing system 102 provides control over the weights to a user device.

Figure 4:
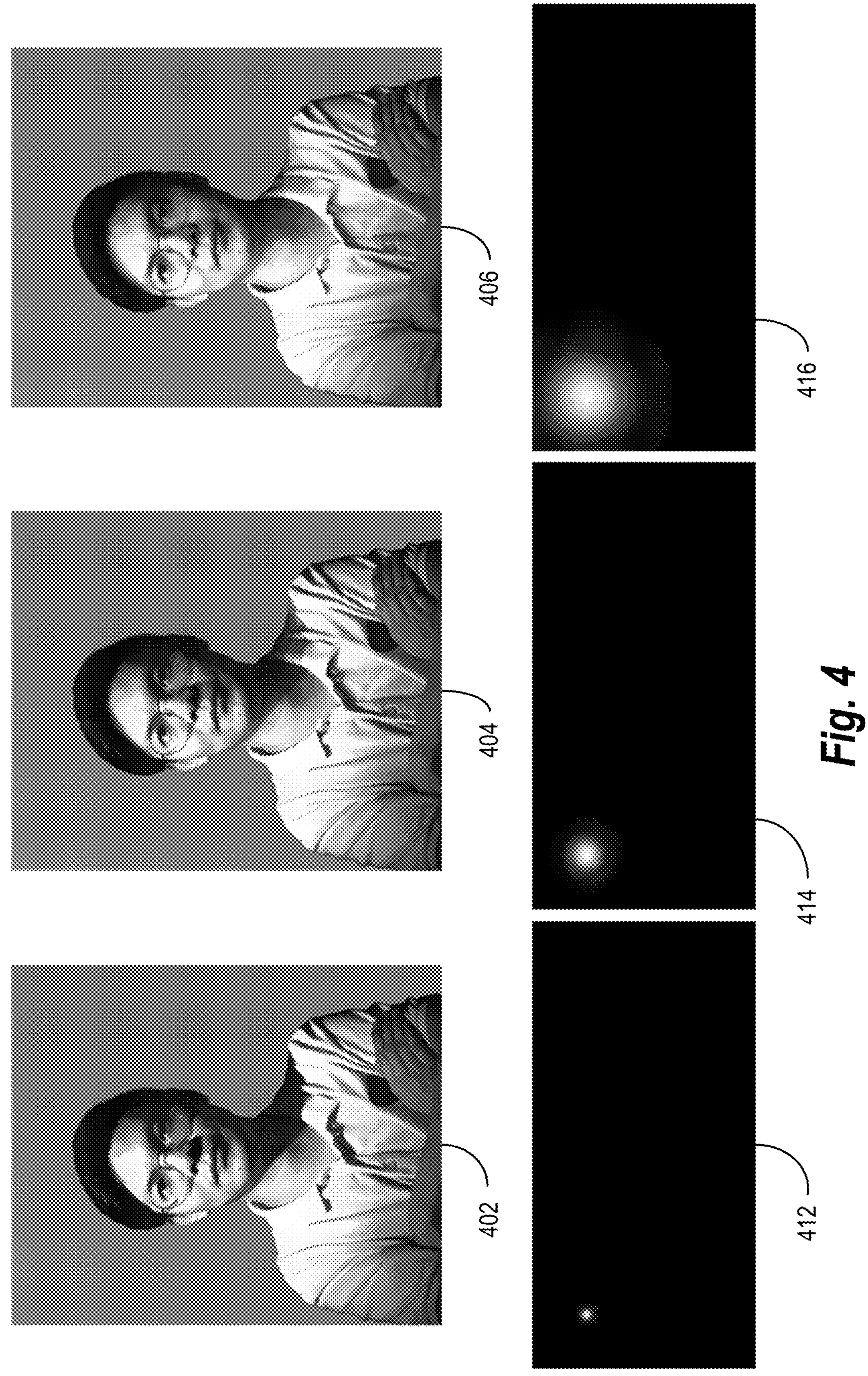
FIG. 4 illustrates edits of a shape or spread of a portrait shadow by the shadow editing system in accordance with one or more embodiments.

FIG. 4 illustrates the shadow editing system 102 editing a shape or spread of a portrait shadow in accordance with one or more embodiments. Specifically, FIG. 4 shows modified digital images 402-406 and corresponding modified environment maps 412-416. In particular, the modified environment map 412 has a Gaussian distribution with a low standard deviation (thus a smaller light source), resulting in the modified digital image 402 that has highly direct lighting on the portrait. By contrast, the modified environment map 414 has a Gaussian distribution with a medium-level standard deviation (thus a moderately spread light source), resulting in the modified digital image 404 that has moderately direct lighting on the portrait. By further contrast, the modified environment map 416 has a Gaussian distribution with a large standard deviation (thus a large light source), resulting in the modified digital image 406 that has highly diffuse lighting on the portrait.

Figure 5:
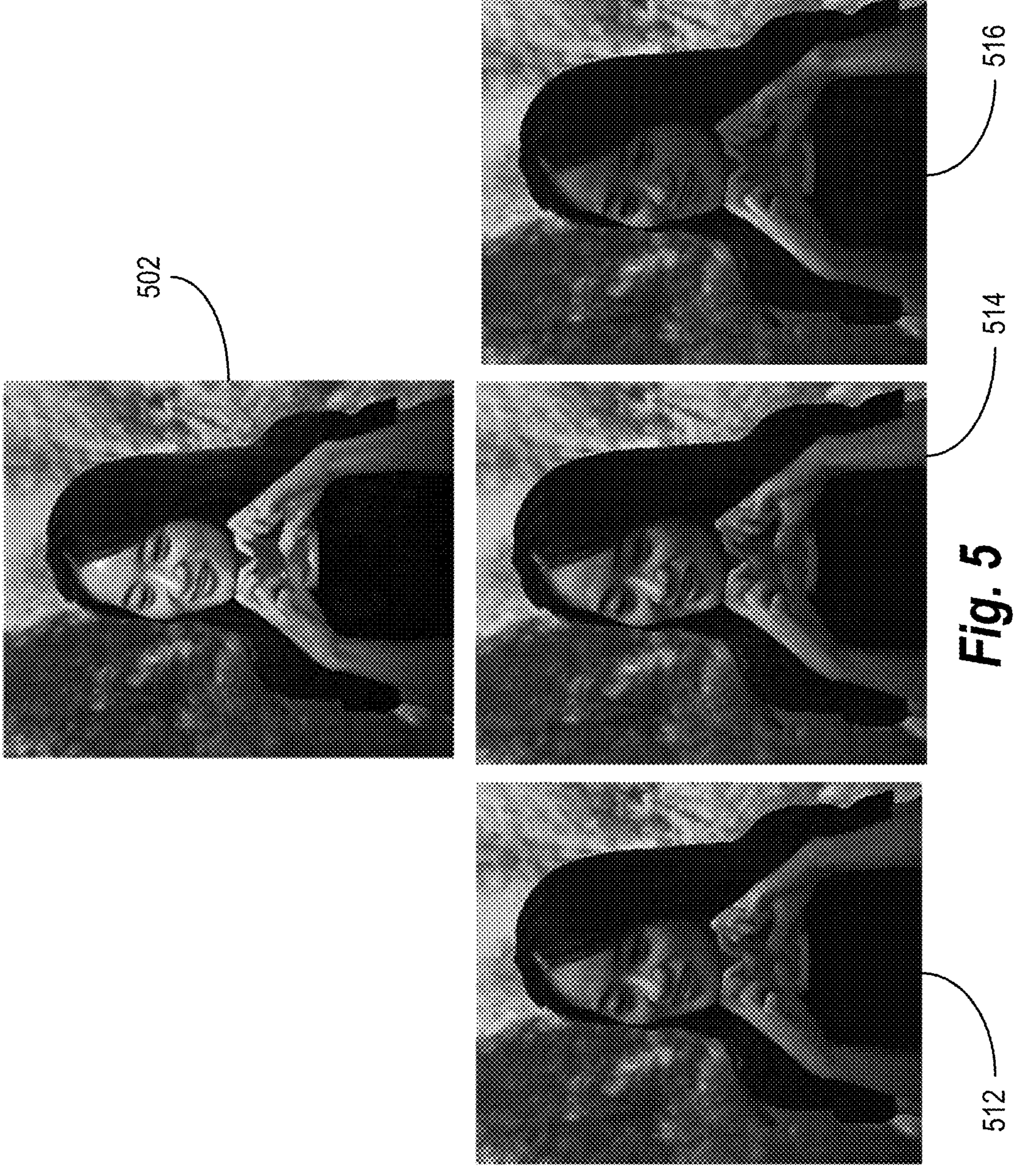
FIG. 5 illustrates edits of a position of a portrait shadow by the shadow editing system in accordance with one or more embodiments.

FIG. 5 illustrates the shadow editing system 102 editing a position of a portrait shadow in accordance with one or more embodiments. Specifically, FIG. 5 shows digital image 502 (e.g., a source input for the shadow editing process). Additionally, FIG. 5 shows various modified digital images 512-516 as outputs of the shadow editing system 102. For example, the modified digital image 512 has shadows predominantly on the left side of the portrait, whereas the modified digital image 514 has shadows on both left and right sides of the portrait, while the modified digital image 516 has shadows predominantly on the right side of the portrait. In each case, the shadow editing system 102 generates the modified digital image based on a selected position of the modified dominant light. By adjusting the position of the modified dominant light, the shadow editing system 102 produces a corresponding change to the position of the resulting shadow in the modified digital image.

Figure 6:
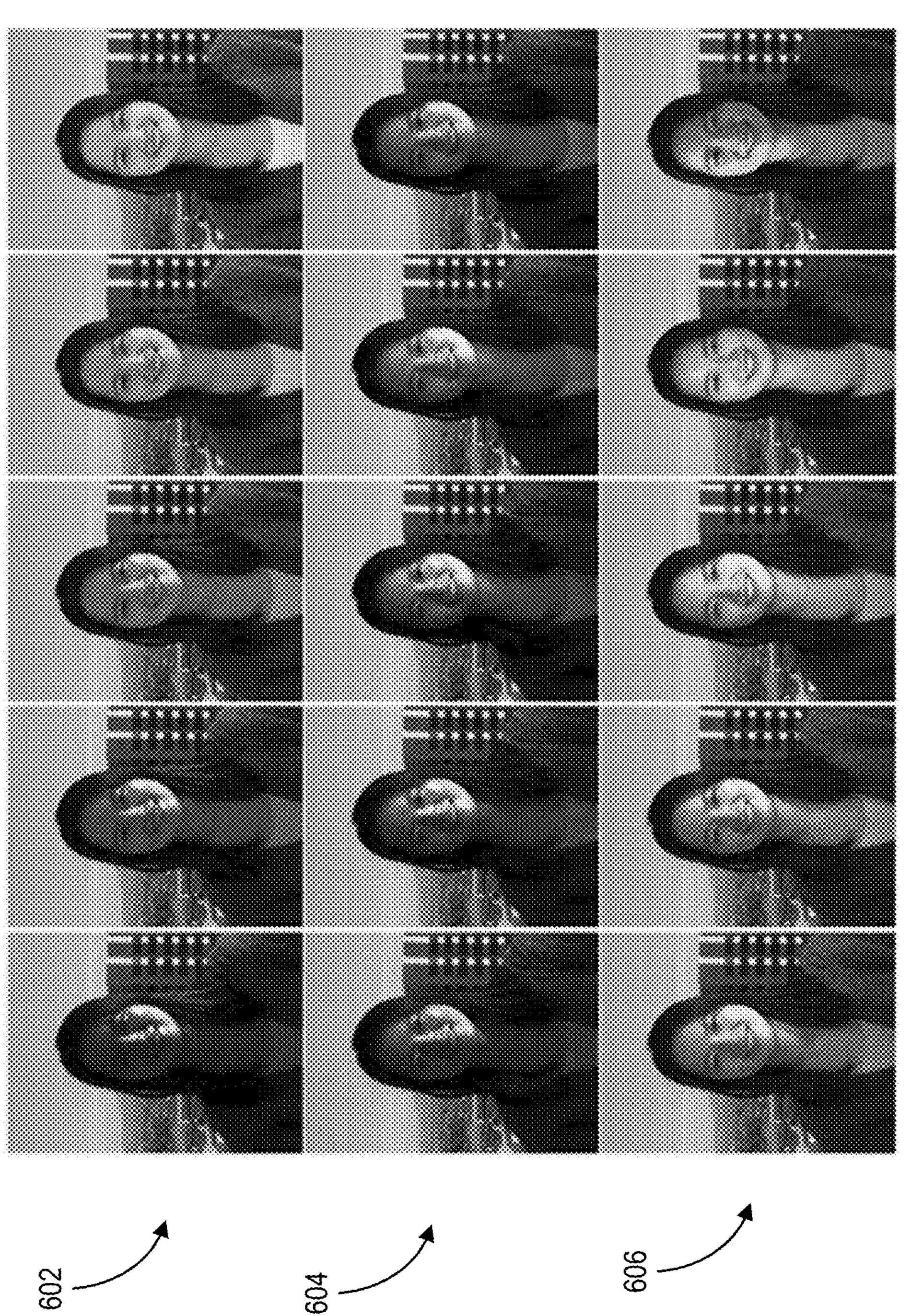
FIG. 6 illustrates edits of intensity, shape or spread, and position of a portrait shadow by the shadow editing system in accordance with one or more embodiments.

FIG. 6 illustrates the shadow editing system 102 editing intensity, shape or spread, and position of a portrait shadow in accordance with one or more embodiments. Specifically, FIG. 6 shows modified digital images 602 with various resulting shadow intensities, modified digital images 604 with various resulting shadow spreads, and modified digital images 606 with various resulting shadow positions. In particular, the shadow editing system 102 generated the modified digital images 602-606 utilizing a DDPM as discussed above.

As represented in FIG. 6, in some cases, the shadow editing system 102 generates modified digital images with sharp shadow boundaries and high overall visual quality. Moreover, the several portraits of FIG. 6 illustrate the broad range of generated shadow outputs of the shadow editing system 102. For example, in the top row, the modified digital images 602 illustrate the portrait with varying shadow intensity (decreasing from left to right). In the middle row, the modified digital images 604 illustrate the portrait with varying shadow spread (decreasing from left to right). Similarly, in the bottom row, the modified digital images 606 illustrate the portrait with varying shadow position (shadow on left side in left-most modified digital image; shadow on right side in right-most modified digital image; transitional positions in-between).

Figure 7:
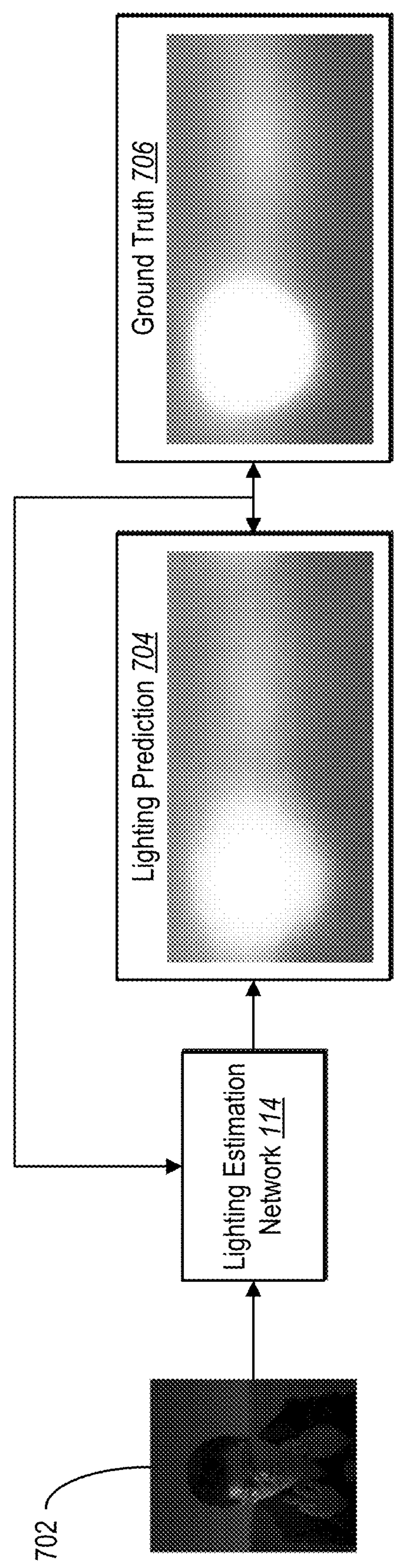
FIG. 7 illustrates the shadow editing system training a lighting estimation network in accordance with one or more embodiments.

As mentioned, in some embodiments, the shadow editing system 102 trains the machine learning models for the shadow editing process. For instance, FIG. 7 illustrates the shadow editing system 102 training the lighting estimation network 114 in accordance with one or more embodiments. Specifically, FIG. 7 shows the lighting estimation network 114 generating a lighting prediction 704 from an input digital image 702. The shadow editing system 102 utilizing one or more loss functions to compare the lighting prediction 704 with a corresponding ground truth environment map 706 (lighting ground truths). The shadow editing system 102 then backpropagates the loss to the lighting estimation network 114 to update the parameters of the lighting estimation network 114 until the lighting estimation network 114 converges or generates predictions within a preset tolerance.

To train the lighting estimation network 114, in some implementations, the shadow editing system 102 applies a measure of lighting estimation loss (e.g., a loss function). For example, the shadow editing system 102 utilizes a reconstruction loss between the predicted environment map 704 ($E_P$) and the ground truth environment map 706 ($E_G$) to modify parameters of the lighting estimation network 114. To illustrate, in some cases, the shadow editing system 102 determines the reconstruction loss as:

$$\mathcal{L}_{recon} = \frac{1}{3HW}\left(\|E_P - E_G\|_2^2\right)$$

where H and W are the size of the environment maps.

In addition, in some implementations, the shadow editing system 102 utilizes a Kullback-Leibler divergence loss to modify parameters of the lighting estimation network 114. To illustrate, in some cases, the shadow editing system 102 determines the Kullback-Leibler divergence loss as:

$$\mathcal{L}_{KLD} = -\frac{1}{2N}\sum_{i=1}^{N}\left(1 + \log\left(\sigma_i^2\right) - \mu_i^2 - \sigma_i^2\right)$$

where N is the dimensionality of the latent vector, μ is the batch mean, and $\sigma^2$ is the batch variance.

In some embodiments, the shadow editing system 102 combines the reconstruction loss and the Kullback-Leibler divergence loss to determine the overall measure of lighting estimation loss:

$$\mathcal{L}_{LE} = \lambda_1\mathcal{L}_{recon} + \lambda_2\mathcal{L}_{KLD}$$

where, in some implementations, $\lambda_1=1$ and $\lambda_2=2.5\times10^{-4}$.

Additionally, in some embodiments, the shadow editing system 102 generates a lighting data set that correlates facial shadows to parameters of dominant lights, and utilizes the lighting data set to train the lighting estimation network 114. For example, the shadow editing system 102 correlates facial shadows in the digital images 702 to parameters of dominant lights illuminating the various scenes of the digital images 702. In some implementations, the shadow editing system 102 determines ground truth environment maps comprising the dominant lights of the lighting data set. Additionally, in some implementations, the shadow editing system 102 modifies parameters of the lighting estimation network 114 based on the ground truth environment maps (e.g., by determining the measure of loss described above and updating parameters of the lighting estimation network 114 to reduce the measure of loss in future iterations of lighting estimation).

Additionally, in some embodiments, the shadow editing system 102 trains the lighting diffusion network 116. For example, the shadow editing system 102 determines a measure of lighting diffusion loss based on a difference between a diffused image and a ground truth diffused image, and modifies parameters of the lighting diffusion network 116 based on the measure of lighting diffusion loss. In some cases, the shadow editing system 102 determines a reconstruction loss for the lighting diffusion network 116 as:

$$\mathcal{L}_{recon} = \frac{1}{3HW}(\|I_D - I_G\|_1)$$

where H and W are the size of the training images, $I_D$ is the predicted diffused image, and $I_G$ is the ground truth diffused image.

In addition, in some implementations, the shadow editing system 102 utilizes a perceptual loss that enforces visual similarity and is computed as a distance between visual geometry group (VGG) features computed for the diffused image and the ground truth diffused image.

In some embodiments, the shadow editing system 102 combines the reconstruction loss and the perceptual loss to determine the overall measure of lighting diffusion loss:

$$\mathcal{L}_{LD} = \mathcal{L}_{recon} + \mathcal{L}_{perceptual}$$

Figure 8:
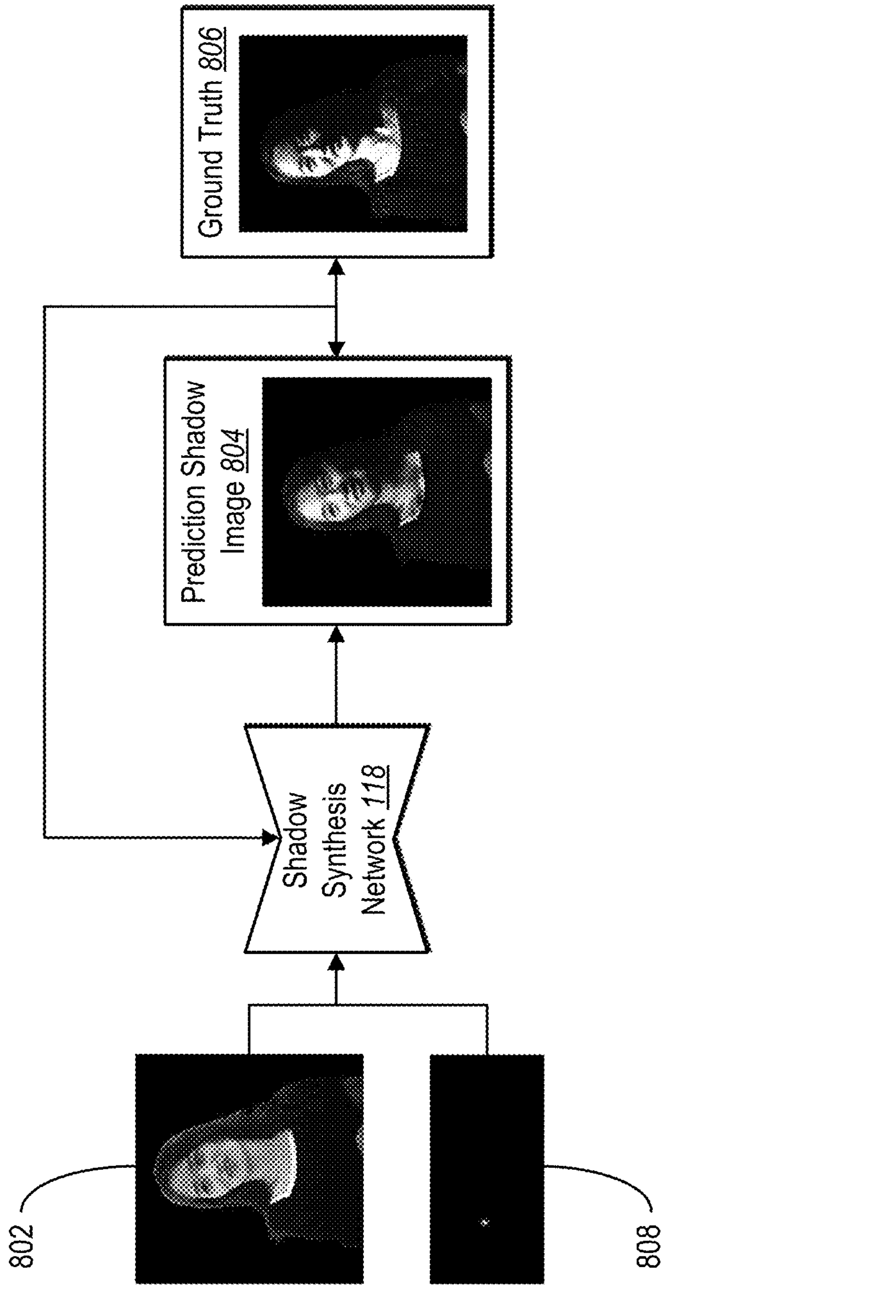
FIG. 8 illustrates the shadow editing system training a shadow synthesis network in accordance with one or more embodiments.

Furthermore, in some implementations, the shadow editing system 102 trains the shadow synthesis network 118. FIG. 8 illustrates the shadow editing system 102 training the shadow synthesis network 118 in accordance with one or more embodiments. Specifically, FIG. 8 shows the shadow synthesis network 118 generating a predicted shadowed image 804 from a diffused image 802 and an environment map 808. In some implementations, during training of the shadow synthesis network 118, the shadow editing system 102 utilizes a feature map-like representation parameterized by the shadow attributes (e.g., as an alternative to using a reshaped environment map-like representation for the dominant light). The shadow editing system 102 utilizes one or more loss functions to compare the predicted shadowed image 804 with a ground truth shadowed image 806. The shadow editing system 102 then backpropagates the loss to the shadow synthesis network 118 to update the parameters of the shadow synthesis network 118 until the shadow synthesis network 118 converges or generates predictions within a preset tolerance.

For example, the shadow editing system 102 determines a measure of shadow synthesis loss based on a difference between a shadowed image and a ground truth shadowed image, and modifies parameters of the shadow synthesis network 118 based on the measure of shadow synthesis loss. In some cases, the shadow editing system 102 determines a reconstruction loss for the shadow synthesis network 118 as:

$$\mathcal{L}_{recon} = \frac{1}{3HW}\left(\|I_S - I_G\|_2^2\right)$$

where $I_S$ is the predicted shadowed image, and $I_G$ is the ground truth shadowed image.

In addition, in some implementations, the shadow editing system 102 determines an adversarial loss (e.g., using the PatchGAN discriminator). In some implementations, the shadow editing system 102 combines the reconstruction loss and the adversarial loss to determine the overall measure of shadow synthesis loss:

$$\mathcal{L}_{SS} = \lambda_1 \mathcal{L}_{recon} + \lambda_2 \mathcal{L}_{adversarial}$$

where, in some implementations, $\lambda_1=1$ and $\lambda_2=0.01$.

As mentioned above, in some embodiments, the shadow editing system 102 provides user control elements for lighting parameters to edit shadows in a digital image. For instance, FIG. 9 illustrates the shadow editing system 102 providing lighting control elements for display in accordance with one or more embodiments.

Figure 9:
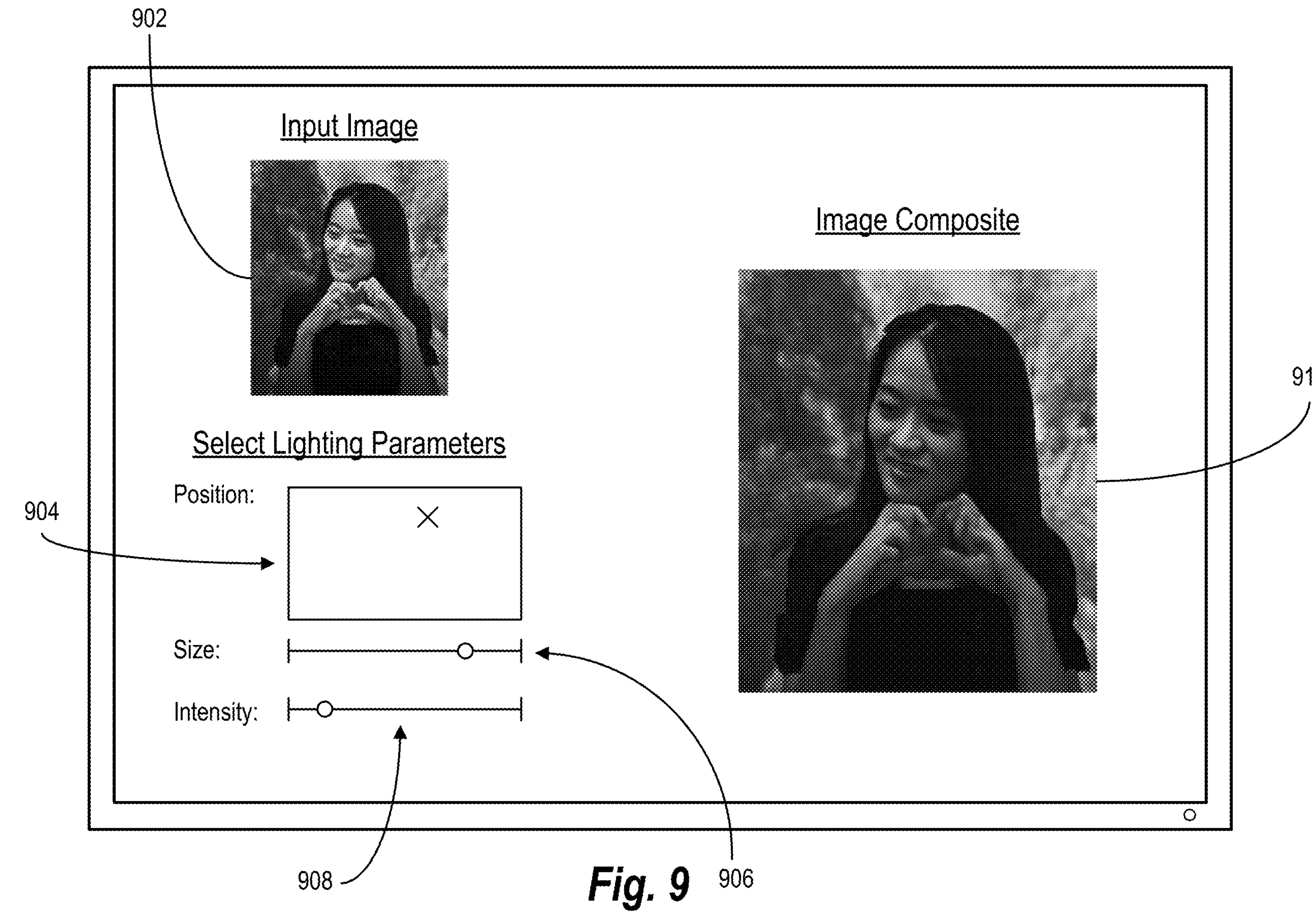
FIG. 9 illustrates the shadow editing system providing lighting control elements for display via a user interface in accordance with one or more embodiments.

Specifically, FIG. 9 shows the shadow editing system 102 providing a graphical user interface for display via a client device. The graphical user interface shows an input digital image 902 for shadow editing. In various implementations, the shadow editing system 102 provides one or more lighting control elements for display via the graphical user interface. For example, FIG. 9 shows the shadow editing system 102 providing, for display, a lighting position control element 904, a lighting size control element 906, and a lighting intensity control element 908.

While FIG. 9 shows the lighting position control element 904 as a rectangular position selection element, and while FIG. 9 shows the lighting size control element 906 and lighting intensity control element 908 as slider elements, other control elements are contemplated as within the scope of the shadow editing system 102. For instance, in some embodiments, the shadow editing system 102 provides handles, scroll wheels, or other control elements to receive inputs for the lighting parameters.

In some implementations, the shadow editing system 102 receives a user interaction with one or more of the lighting position control element 904, the lighting size control element 906, or the lighting intensity control element 908. Based on the user interaction with the one or more lighting control elements, the shadow editing system 102 determines at least one of a position, a size, or an intensity of a modified dominant light for a modified environment map, as described above.

Moreover, in some implementations, the shadow editing system 102 provides a modified digital image 910 for display via the graphical user interface. For example, as a user adjusts one or more of the lighting position control element 904, the lighting size control element 906, or the lighting intensity control element 908, the shadow editing system 102 updates the modified digital image 910 and provides the updated image for display.

Thus, the shadow editing system 102 provides a user with the ability to edit shadows in many ways. For example, as described above, the shadow editing system 102 provides for softening shadows, intensifying shadows, modifying light size, rotating shadows, adding light sources, modifying light shape, removing shadows, etc.

The shadow editing system 102 was tested for shadow editing performance (synthesis and removal) by using randomly sampled, unseen lighting positions as the target lights to generate relit light stage images of 20 test subjects, which serve as ground truth. Each input image is rendered with a randomly selected environment map out of unseen testing outdoor environment maps and is first passed to the lighting diffusion network to generate diffuse image $I_D$. $I_D$ and target environment map $E_T$ are then fed to the two-stage shadow synthesis pipeline to generate the newly shadowed image $I_S$, which is evaluated against the ground truth light stage image. Table 1 compares the shadow editing performance of the shadow editing system 102 against prior relighting methods. Prior system 1 is that by Hou et al., Face Relighting with Geometrically Consistent Shadows, In CVPR, 2022. Prior System 2 is that by Pandey, et. al., Total relighting: Learning to relight portraits for background replacement, In SIGGRAPH 2021. The shadow editing system 102 provides better results on all metrics (MAE, MSE, SSIM, and LPIPS). Furthermore, the shadow editing system 102 is able to synthesize appropriate shadows for various light positions. Prior System 1 is unable to remove existing shadows in the source image and the shadow traces carry over as artifacts to the relit images. In addition, Prior System 1 only models the lighting direction and does not model the light size as a parameter, which leads to inaccurate shadow shape when the light size is varied. Prior System 2 is often unable to synthesize physically plausible shadows and will sometimes overshadow the image. Moreover, their shadows are often blurry and not as sharp those produced by the shadow editing system 102. Compared to the baselines, the shadow editing system 102 is able to properly remove existing shadows from the source image and synthesize geometrically plausible and realistic shadows for a wide variety of lighting conditions.

TABLE 1

| | MAE | MSE | SSIM | LPIPS |
|---|---|---|---|---|
| Prior System 1 | 0.1247 | 0.0474 | 0.7079 | 0.2333 |
| Prior System 2 | 0.1038 | 0.0385 | 0.7762 | 0.2062 |
| Shadow Editing System 102 | 0.0891 | 0.0297 | 0.7984 | 0.1616 |

Figure 10:
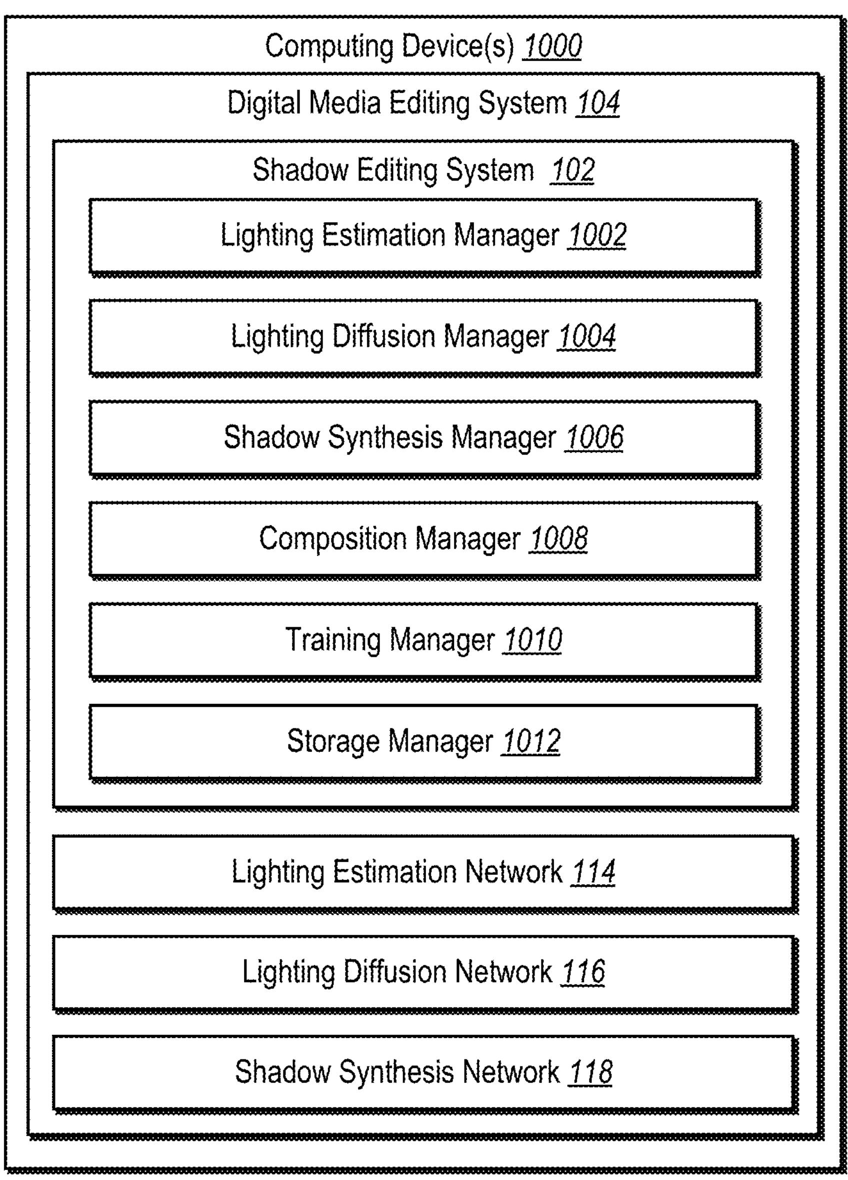
FIG. 10 illustrates a diagram of an example architecture of the shadow editing system in accordance with one or more embodiments.

Turning now to FIG. 10, additional detail will be provided regarding components and capabilities of one or more embodiments of the shadow editing system 102. In particular, FIG. 10 illustrates an example shadow editing system 102 executed by a computing device(s) 1000 (e.g., the server device(s) 106 or the client device 108). As shown by the embodiment of FIG. 10, the computing device(s) 1000 includes or hosts the digital media editing system 104 and/or the shadow editing system 102. Furthermore, as shown in FIG. 10, the shadow editing system 102 includes a lighting estimation manager 1002, a lighting diffusion manager 1004, a shadow synthesis manager 1006, a composition manager 1008, a training manager 1010, and a storage manager 1012.

As shown in FIG. 10, the shadow editing system 102 includes a lighting estimation manager 1002. In some implementations, the lighting estimation manager 1002 determines an environment map for a digital image. For instance, the lighting estimation manager 1002 utilizes the lighting estimation network 114 to determine one or more light sources illuminating the digital image.

In addition, as shown in FIG. 10, the shadow editing system 102 includes a lighting diffusion manager 1004. In some implementations, the lighting diffusion manager 1004 generates a diffused image from the digital image. For example, the lighting diffusion manager 1004 utilizes the lighting diffusion network 116 to smooth the shading of the digital image into ambient-lighted conditions.

Moreover, as shown in FIG. 10, the shadow editing system 102 includes a shadow synthesis manager 1006. In some implementations, the shadow synthesis manager 1006 generates a shadowed image from the diffused image. For instance, the shadow synthesis manager 1006 utilizes the shadow synthesis network 118 to add lighting of a modified dominant light into the image of the diffused image.

Furthermore, as shown in FIG. 10, the shadow editing system 102 includes a composition manager 1008. In some implementations, the composition manager 1008 generates a modified digital image from the diffused image and the shadowed image. For example, the composition manager 1008 combines the diffused image and the shadowed image as a weighted composition.

Additionally, as shown in FIG. 10, the shadow editing system 102 includes a training manager 1010. In some implementations, the training manager 1010 trains (e.g., modifies parameters of) one or more machine learning models, as described above, including a lighting estimation network 114, a lighting diffusion network 116, and/or a shadow synthesis network 118. For example, the training manager 1010 determines a measure of lighting estimation loss for the lighting estimation network 114, a measure of lighting diffusion loss for the lighting diffusion network 116, and a measure of shadow synthesis loss for the shadow synthesis network 118.

Moreover, as shown in FIG. 10, the shadow editing system 102 includes a storage manager 1012. In some implementations, the storage manager 1012 stores information (e.g., via one or more memory devices) on behalf of the shadow editing system 102. For example, the storage manager 1012 stores digital images, environment maps, modified environment maps, diffused images, shadowed images, and/or modified digital images. Moreover, in some embodiments, the storage manager 1012 stores parameters of the lighting estimation network 114, the lighting diffusion network 116, and/or the shadow synthesis network 118.

Each of the components 1002-1012 of the shadow editing system 102 includes software, hardware, or both. For example, the components 1002-1012 include one or more instructions stored on a computer-readable storage medium and executable by processors of one or more computing devices, such as a client device or server device. When executed by the one or more processors, in some implementations, the computer-executable instructions of the shadow editing system 102 cause the computing device(s) to perform the methods described herein. Alternatively, in one or more implementations, the components 1002-1012 include hardware, such as a special purpose processing device to perform a certain function or group of functions. Alternatively, in some implementations, the components 1002-1012 of the shadow editing system 102 include a combination of computer-executable instructions and hardware.

Furthermore, the components 1002-1012 of the shadow editing system 102 are, for example, implemented as one or more operating systems, as one or more stand-alone applications, as one or more modules of an application, as one or more plug-ins, as one or more library functions, as one or more functions callable by other applications, and/or as a cloud-computing model. Thus, in some implementations, the components 1002-1012 are implemented as a stand-alone application, such as a desktop or mobile application. Furthermore, in various implementations, the components 1002-1012 are implemented as one or more web-based applications hosted on a remote server. In some implementations, the components 1002-1012 are implemented in a suite of mobile device applications or "apps." To illustrate, in some implementations, the components 1002-1012 are implemented in an application, including but not limited to Adobe Creative Cloud, Adobe Lightroom, Adobe Photoshop, and Adobe Premiere. The foregoing are either registered trademarks or trademarks of Adobe in the United States and/or other countries.

Figure 11:
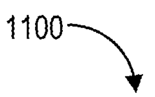
FIG. 11 illustrates a flowchart of a series of acts for editing shadows in digital images in accordance with one or more embodiments.
Figure 11:
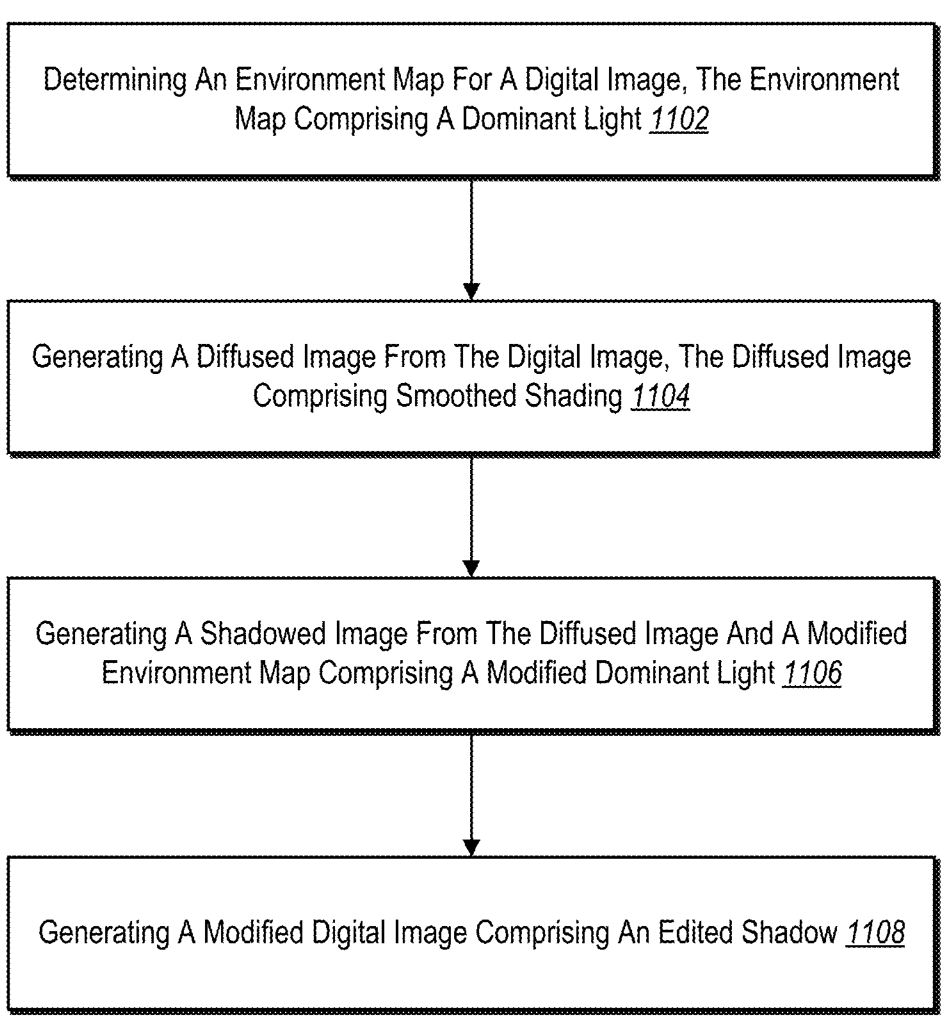

FIGS. 1-10, the corresponding text, and the examples provide a number of different methods, systems, devices, and non-transitory computer-readable media of the shadow editing system 102. In addition to the foregoing, one or more embodiments are described in terms of flowcharts comprising acts for accomplishing a particular result, as shown in FIG. 11. In some implementations, the processes of the shadow editing system 102 are performed with more or fewer acts. Furthermore, in various implementations, the acts are performed in differing orders. Additionally, in some implementations, the acts described herein are repeated or performed in parallel with one another or parallel with different instances of the same or similar acts.

As mentioned, FIG. 11 illustrates a flowchart of a series of acts 1100 for editing shadows of a digital image in accordance with one or more implementations. While FIG. 11 illustrates acts according to one implementation, alternative implementations omit, add to, reorder, and/or modify any of the acts shown in FIG. 11. In one or more implementations, the acts of FIG. 11 are performed as part of a method. Alternatively, in one or more implementations, a non-transitory computer-readable storage medium comprises instructions that, when executed by one or more processors, cause a computing device to perform the acts of FIG. 11. In some implementations, a system performs the acts of FIG. 11.

As shown in FIG. 11, the series of acts 1100 includes an act 1102 of determining an environment map for a digital image, the environment map comprising a dominant light, an act 1104 of generating a diffused image from the digital image, the diffused image comprising smoothed shading, an act 1106 of generating a shadowed image from the diffused image and a modified environment map comprising a modified dominant light, and an act 1108 of generating a modified digital image comprising an edited shadow.

In particular, in some implementations, the act 1102 includes determining, utilizing a lighting estimation network, an environment map for a digital image, the environment map comprising a dominant light, the act 1104 includes generating, utilizing a lighting diffusion network, a diffused image from the digital image, the diffused image comprising smoothed shading, the act 1106 includes generating, utilizing a shadow synthesis network, a shadowed image from the diffused image and a modified environment map comprising a modified dominant light, and the act 1108 includes generating, from the diffused image and the shadowed image, a modified digital image comprising an edited shadow.

For example, in some implementations, the series of acts 1100 includes determining the environment map by determining at least one of a position, a size, or an intensity of the dominant light. In addition, in some implementations, the series of acts 1100 includes modeling the dominant light as a two-dimensional isotropic Gaussian light source. Moreover, in some implementations, the series of acts 1100 includes generating the diffused image by removing hard shadows and specular highlights of the digital image.

Furthermore, in some implementations, the series of acts 1100 includes generating the modified environment map by changing at least a position, a size, or an intensity of the dominant light of the environment map. In addition, in some implementations, the series of acts 1100 includes generating the shadowed image by applying the modified dominant light to the diffused image. Moreover, in some implementations, the series of acts 1100 includes generating the modified digital image by compositing the diffused image and the shadowed image as a weighted combination.

Furthermore, in some implementations, the series of acts 1100 includes determining the environment map for the digital image by converting nonparametric information for the dominant light into position, size, and intensity parameters for the dominant light. Moreover, in some implementations, the series of acts 1100 includes generating the diffused image from the digital image by generating an ambient-lighted image, and generating the shadowed image from the diffused image and the modified environment map by generating a dominant-lighted image. In addition, in some implementations, the series of acts 1100 includes generating a lighting data set that correlates facial shadows to parameters of dominant lights; determining ground truth environment maps comprising the dominant lights of the lighting data set; and modifying parameters of the lighting estimation network based on the ground truth environment maps.

Moreover, in some implementations, the series of acts 1100 includes receiving a user interaction with a lighting control element via a user interface of a client device; and determining, based on the user interaction with the lighting control element, a change to at least one of a position, a size, or an intensity of the dominant light for the modified environment map. In addition, in some implementations, the series of acts 1100 includes generating the modified digital image by generating an updated portrait with the edited shadow.

Furthermore, in some implementations, the series of acts 1100 includes determining, utilizing a lighting estimation network, an environment map for a digital image, the environment map comprising a dominant light; generating a diffused image from the digital image by utilizing a lighting diffusion network to remove hard shadows and specular highlights of the digital image; generating a shadowed image from the diffused image and a modified environment map by utilizing a shadow synthesis network to apply a modified dominant light to the diffused image; and generating a modified digital image comprising an edited shadow for the digital image by compositing the diffused image and the shadowed image.

For example, in some implementations, the series of acts 1100 includes determining the environment map by determining a three-dimensional intensity of the dominant light. In addition, in some implementations, the series of acts 1100 includes providing, for display via a user interface of a client device, a lighting control element; and determining, based on a user interaction with the lighting control element, at least one of a position, a size, or an intensity of the modified dominant light for the modified environment map. Moreover, in some implementations, the series of acts 1100 includes determining the modified environment map comprising the modified dominant light and a new dominant light, wherein generating the shadowed image from the diffused image and the modified environment map comprises utilizing the shadow synthesis network to apply the modified dominant light and the new dominant light to the diffused image.

Furthermore, in some implementations, the series of acts 1100 includes determining a measure of lighting estimation loss based on a difference between the environment map and a ground truth environment map; and modifying parameters of the lighting estimation network based on the measure of lighting estimation loss. In addition, in some implementations, the series of acts 1100 includes determining a measure of lighting diffusion loss based on a difference between the diffused image and a ground truth diffused image; and modifying parameters of the lighting diffusion network based on the measure of lighting diffusion loss. Moreover, in some implementations, the series of acts 1100 includes determining a measure of shadow synthesis loss based on a difference between the shadowed image and a ground truth shadowed image; and modifying parameters of the shadow synthesis network based on the measure of shadow synthesis loss.

Embodiments of the present disclosure may comprise or utilize a special purpose or general purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions from a non-transitory computer-readable medium (e.g., memory) and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general purpose computer, special purpose computer, or special purpose processing device to perform a certain function or group of functions. In some embodiments, computer-executable instructions are executed by a general purpose computer to turn the general purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), a web service, Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
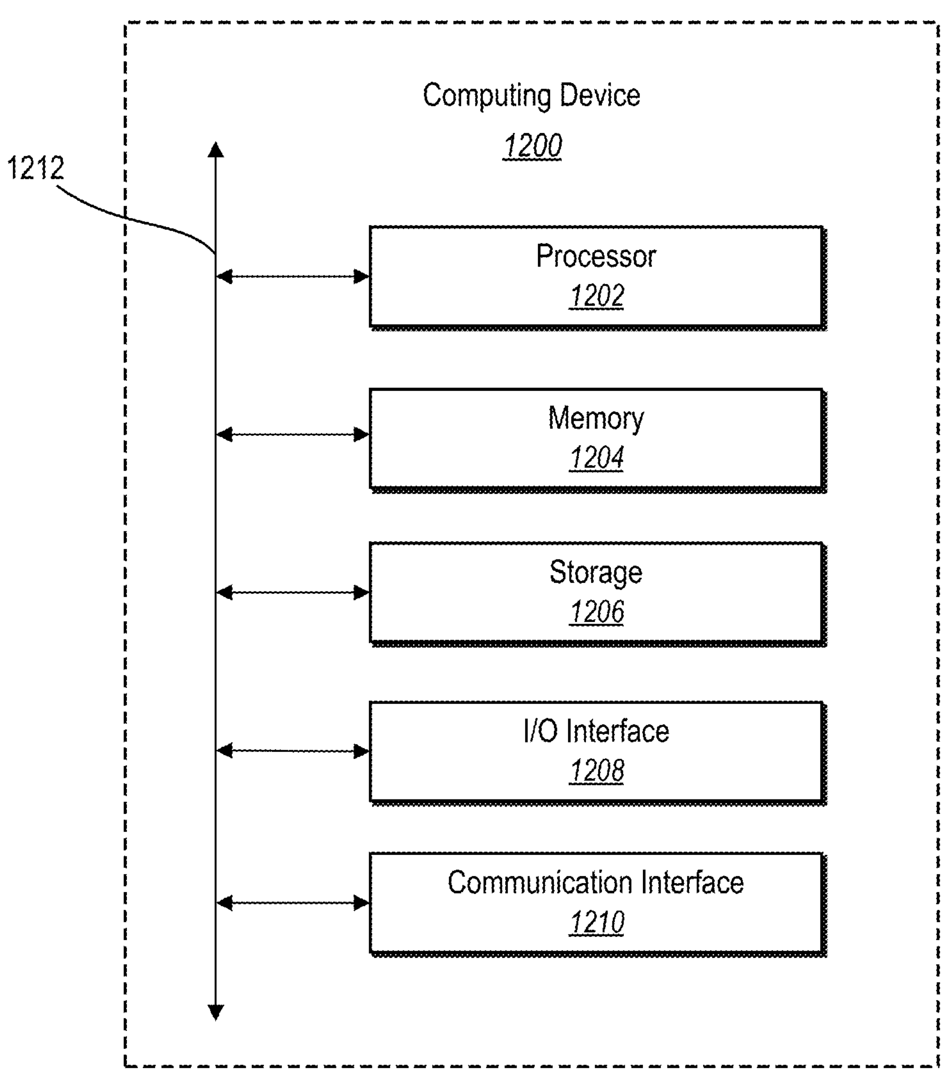
FIG. 12 illustrates a block diagram of an example computing device for implementing one or more embodiments of the present disclosure.

FIG. 12 illustrates a block diagram of an example computing device 1200 that may be configured to perform one or more of the processes described above. One will appreciate that one or more computing devices, such as the computing device 1200, may represent the computing devices described above (e.g., the computing device(s) 1000, the server device(s) 106, or the client device 108). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes the memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes the storage device 1206 for storing data or instructions. As an example, and not by way of limitation, the storage device 1206 can include a non-transitory storage medium described above. The storage device 1206 may include a hard disk drive ("HDD"), flash memory, a Universal Serial Bus ("USB") drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller ("NIC") or network adapter for communicating with an Ethernet or other wire-based network or a wireless NIC ("WNIC") or wireless adapter for communicating with a wireless network, such as a WI-FI. The computing device 1200 can further include the bus 1212. The bus 1212 can include hardware, software, or both that connects components of computing device 1200 to each other.

The use in the foregoing description and in the appended claims of the terms "first," "second," "third," etc., is not necessarily to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget, and not necessarily to connote that the second widget has two sides.

In the foregoing description, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

determining, utilizing a lighting estimation network, an environment map for a digital image, the environment map comprising a dominant light;

generating, utilizing a lighting diffusion network to remove at least one of specular highlights or hard shadows from the digital image, a diffused image from the digital image, the diffused image comprising smoothed shading and ambient lighting;

generating, utilizing a shadow synthesis network, a shadowed image from the diffused image and a modified environment map comprising a modified dominant light; and generating, from the diffused image and the shadowed image, a modified digital image comprising an edited shadow.

2. The computer-implemented method of claim 1, wherein determining the environment map comprises determining at least one of a position, a size, or an intensity of the dominant light.

3. The computer-implemented method of claim 1, further comprising modeling the dominant light as a two-dimensional isotropic Gaussian light source.

4. The computer-implemented method of claim 1, wherein generating the diffused image comprises removing the hard shadows and the specular highlights of the digital image.

5. The computer-implemented method of claim 1, further comprising generating the modified environment map by changing at least a position, a size, or an intensity of the dominant light of the environment map.

6. The computer-implemented method of claim 1, wherein generating the shadowed image comprises applying the modified dominant light to the diffused image.

7. The computer-implemented method of claim 1, wherein generating the modified digital image comprises compositing the diffused image and the shadowed image as a weighted combination.

8. A system comprising:

one or more memory devices; and one or more processors coupled to the one or more memory devices that cause the system to perform operations comprising:

determining, utilizing a lighting estimation network, an environment map for a digital image, the environment map comprising a dominant light;

generating a diffused image comprising smoothed shading and ambient lighting from the digital image by utilizing a lighting diffusion network to remove hard shadows and specular highlights of the digital image;

generating a shadowed image from the diffused image and a modified environment map by utilizing a shadow synthesis network to apply a modified dominant light to the diffused image; and generating a modified digital image comprising an edited shadow for the digital image by compositing the diffused image and the shadowed image.

9. The system of claim 8, wherein determining the environment map comprises determining a three-dimensional intensity of the dominant light.

10. The system of claim 8, wherein the one or more processors further cause the system to perform additional operations comprising:

providing, for display via a user interface of a client device, a lighting control element; and determining, based on a user interaction with the lighting control element, at least one of a position, a size, or an intensity of the modified dominant light for the modified environment map.

11. The system of claim 8, wherein the one or more processors further cause the system to perform additional operations comprising:

determining the modified environment map comprising the modified dominant light and a new dominant light, wherein generating the shadowed image from the diffused image and the modified environment map comprises utilizing the shadow synthesis network to apply the modified dominant light and the new dominant light to the diffused image.

12. The system of claim 8, wherein the one or more processors further cause the system to perform additional operations comprising:

determining a measure of lighting estimation loss based on a difference between the environment map and a ground truth environment map; and modifying parameters of the lighting estimation network based on the measure of lighting estimation loss.

13. The system of claim 8, wherein the one or more processors further cause the system to perform additional operations comprising:

determining a measure of lighting diffusion loss based on a difference between the diffused image and a ground truth diffused image; and modifying parameters of the lighting diffusion network based on the measure of lighting diffusion loss.

14. The system of claim 8, wherein the one or more processors further cause the system to perform additional operations comprising:

determining a measure of shadow synthesis loss based on a difference between the shadowed image and a ground truth shadowed image; and modifying parameters of the shadow synthesis network based on the measure of shadow synthesis loss.

15. A non-transitory computer-readable medium storing instructions thereon that, when executed by at least one processor, cause the at least one processor to perform operations comprising:

determining, utilizing a lighting estimation network, an environment map for a digital image, the environment map comprising a dominant light;

generating, utilizing a lighting diffusion network to remove at least one of specular highlights or hard shadows from the digital image, a diffused image from the digital image, the diffused image comprising smoothed shading and ambient lighting;

generating, utilizing a shadow synthesis network, a shadowed image from the diffused image and a modified environment map comprising a modified dominant light; and generating, from the diffused image and the shadowed image, a modified digital image comprising an edited shadow.

16. The non-transitory computer-readable medium of claim 15, wherein determining the environment map for the digital image comprises converting nonparametric information for the dominant light into position, size, and intensity parameters for the dominant light.

17. The non-transitory computer-readable medium of claim 15, wherein:

generating the diffused image from the digital image comprises generating an ambient-lighted image, and generating the shadowed image from the diffused image and the modified environment map comprises generating a dominant-lighted image.

18. The non-transitory computer-readable medium of claim 15, further storing instructions thereon that, when executed by the at least one processor, cause the at least one processor to perform additional operations comprising:

generating a lighting data set that correlates facial shadows to parameters of dominant lights;

determining ground truth environment maps comprising the dominant lights of the lighting data set; and modifying parameters of the lighting estimation network based on the ground truth environment maps.

19. The non-transitory computer-readable medium of claim 15, further storing instructions thereon that, when executed by the at least one processor, cause the at least one processor to perform additional operations comprising:

receiving a user interaction with a lighting control element via a user interface of a client device; and determining, based on the user interaction with the lighting control element, a change to at least one of a position, a size, or an intensity of the dominant light for the modified environment map.

20. The non-transitory computer-readable medium of claim 15, wherein the digital image comprises a portrait, and wherein generating the modified digital image comprises generating an updated portrait with the edited shadow.

* * * * *